June 1, 1954  M. BOZOIAN  2,680,012
ANALYTICAL BALANCE
Filed Jan. 26, 1948  12 Sheets-Sheet 2

INVENTOR.
MICHAEL BOZOIAN
BY
Whitmore Hulbert & Belknap
ATTORNEYS

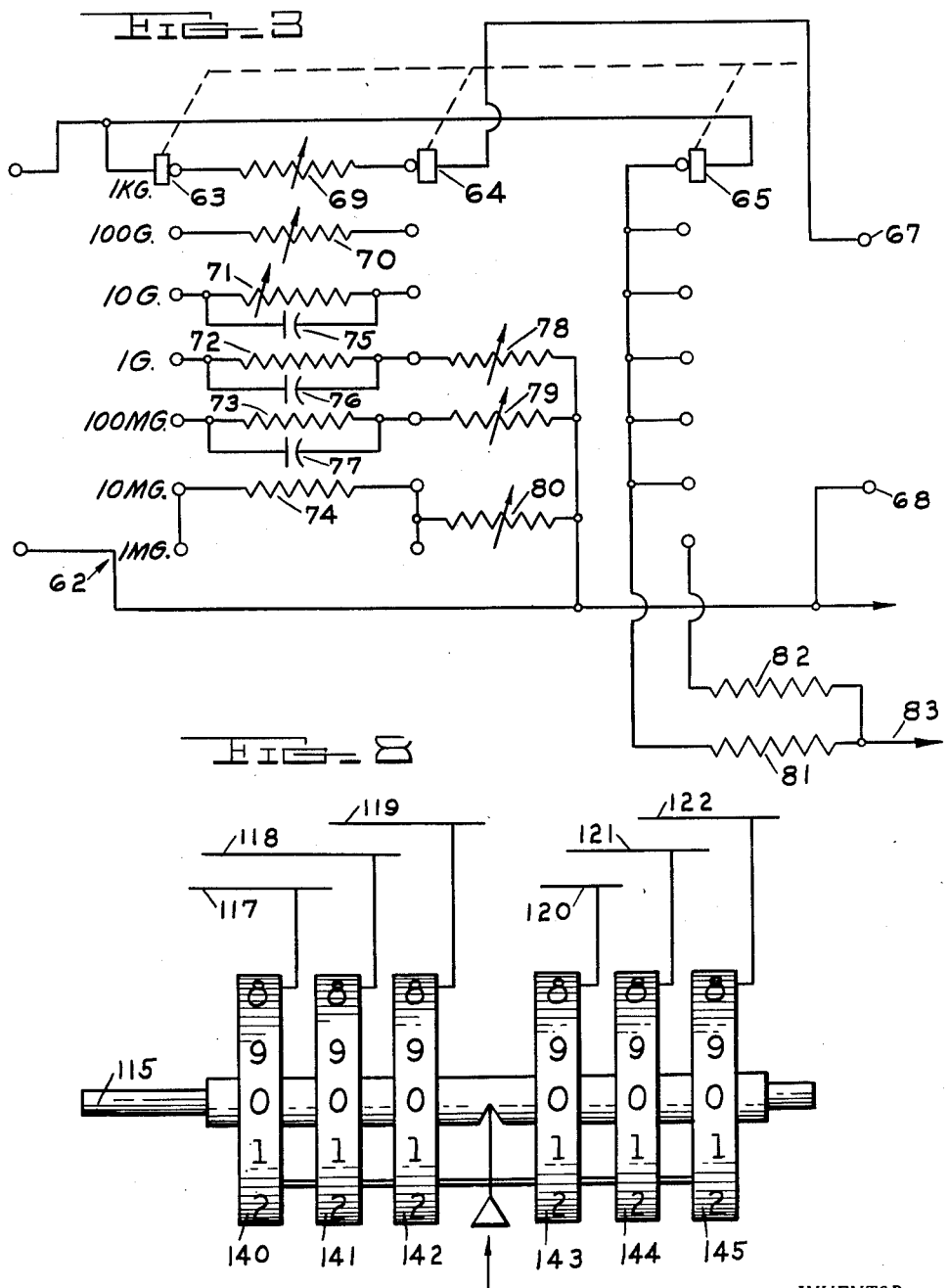

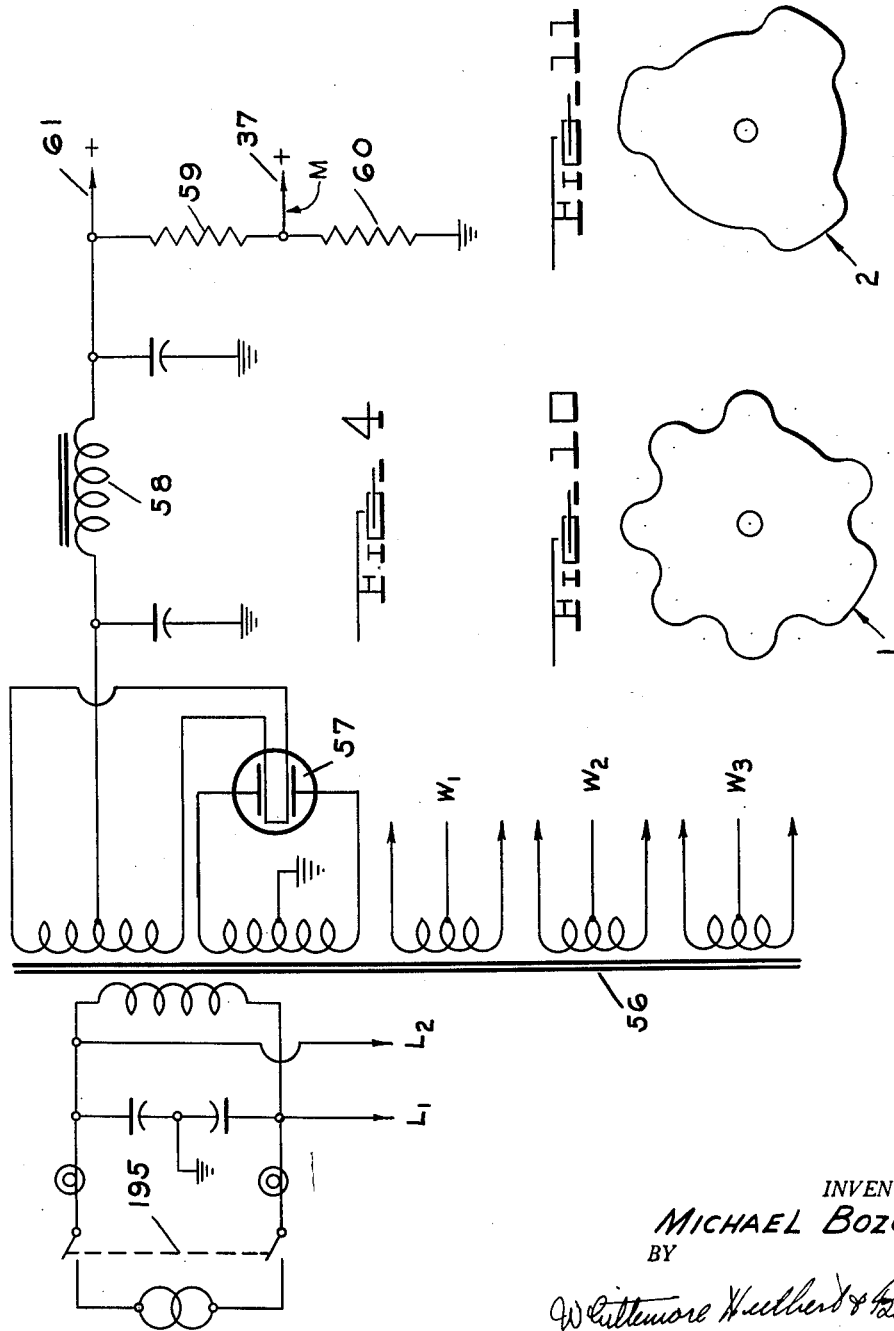

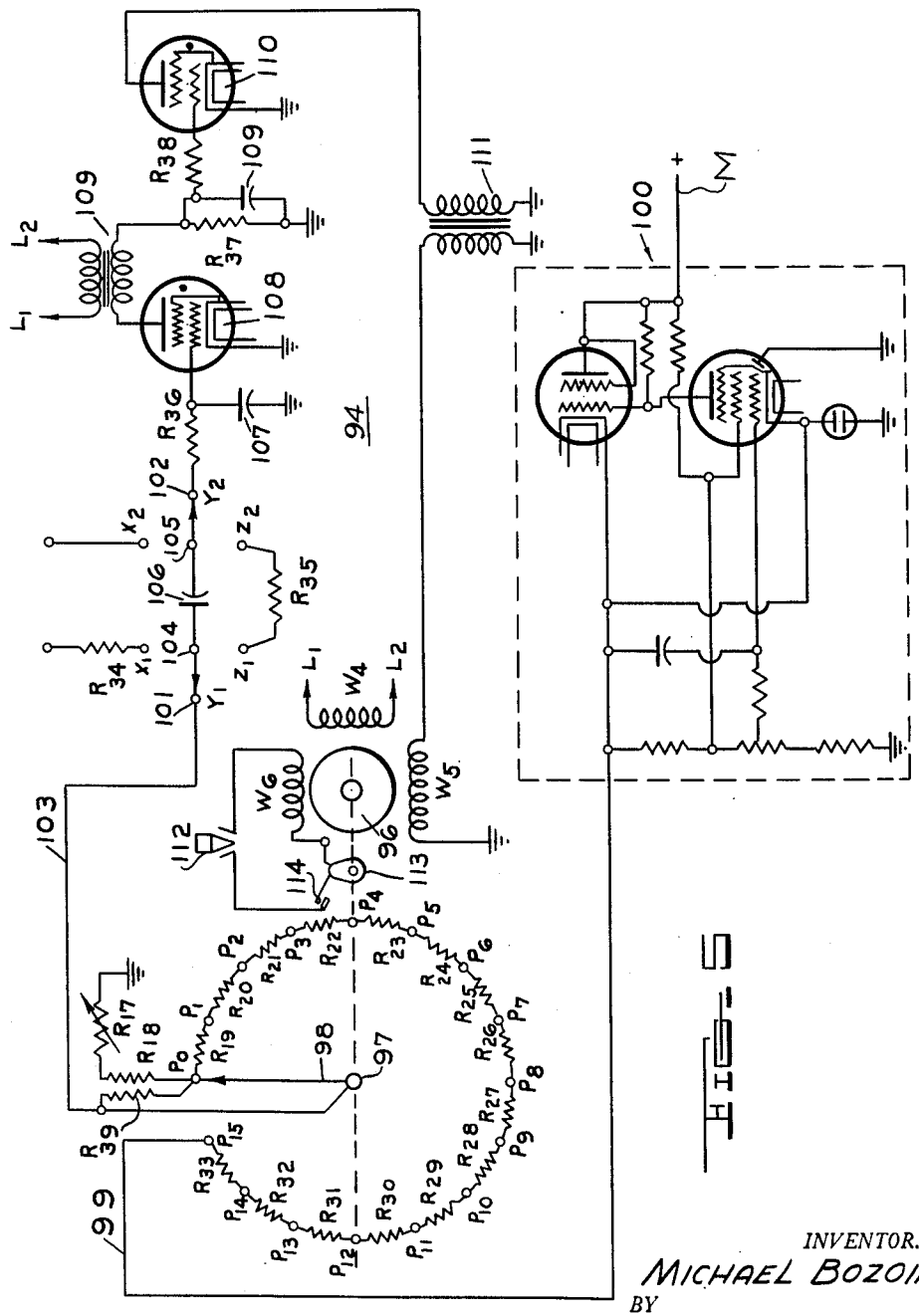

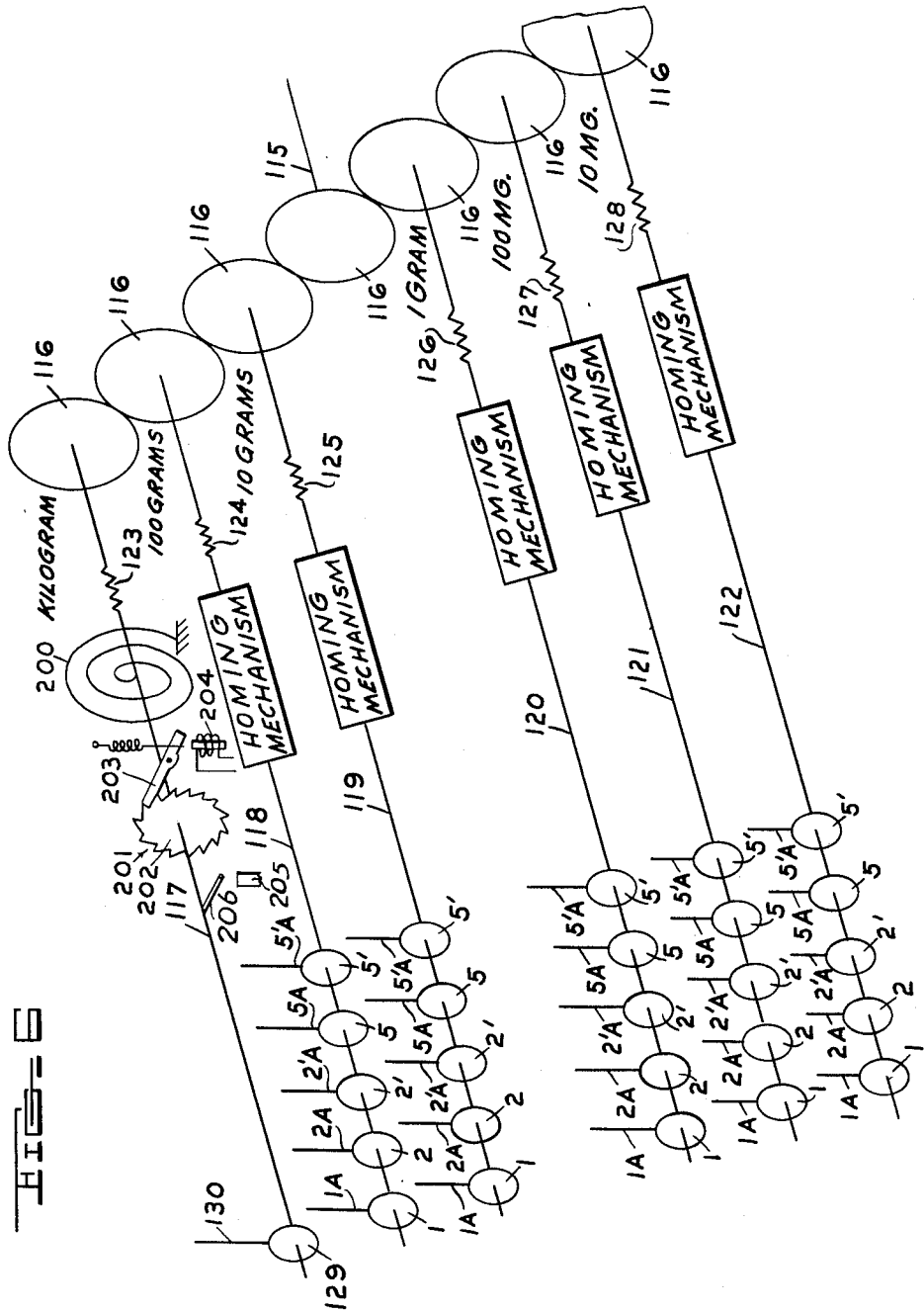

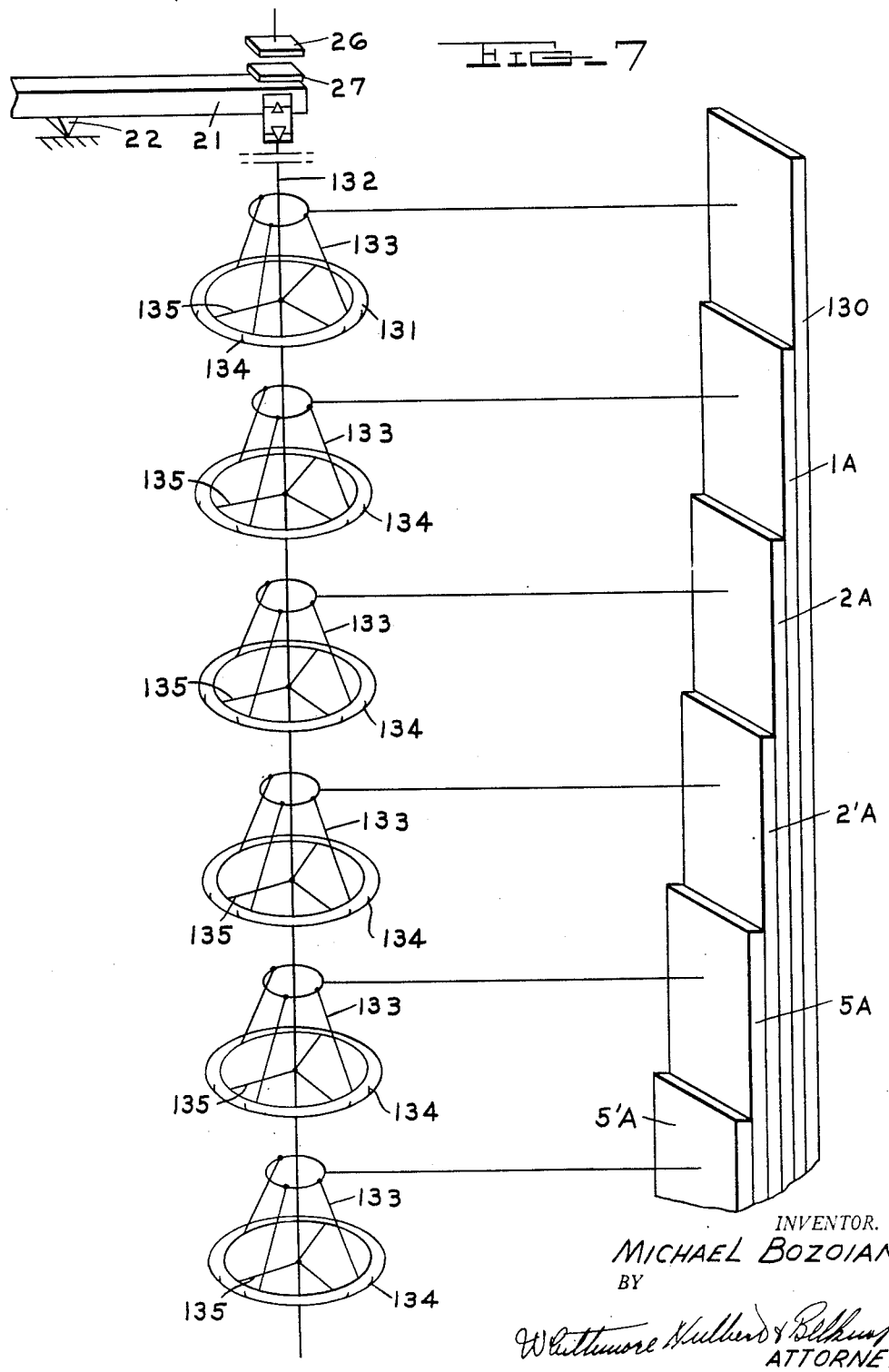

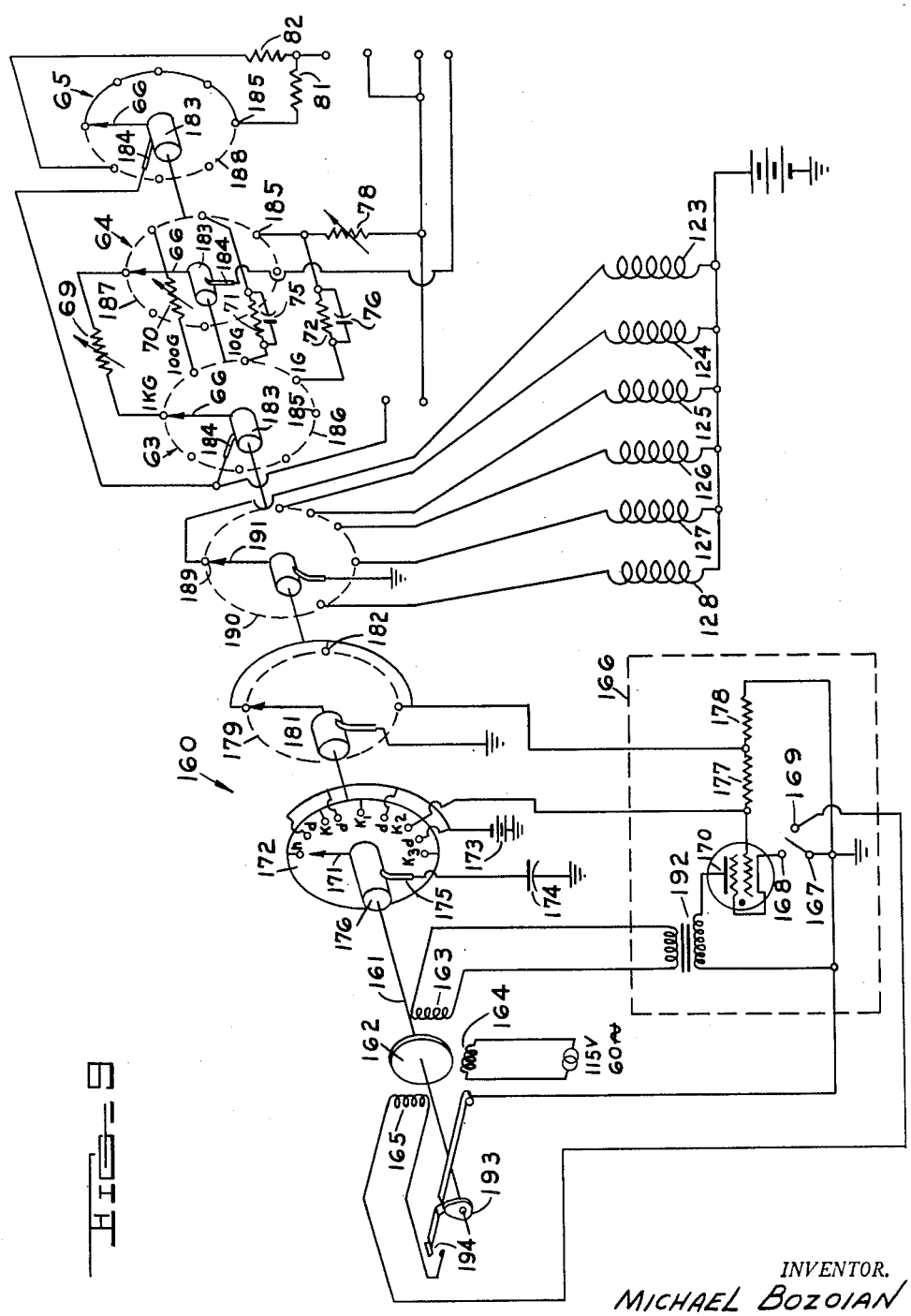

INVENTOR.
MICHAEL BOZOIAN
BY
ATTORNEYS

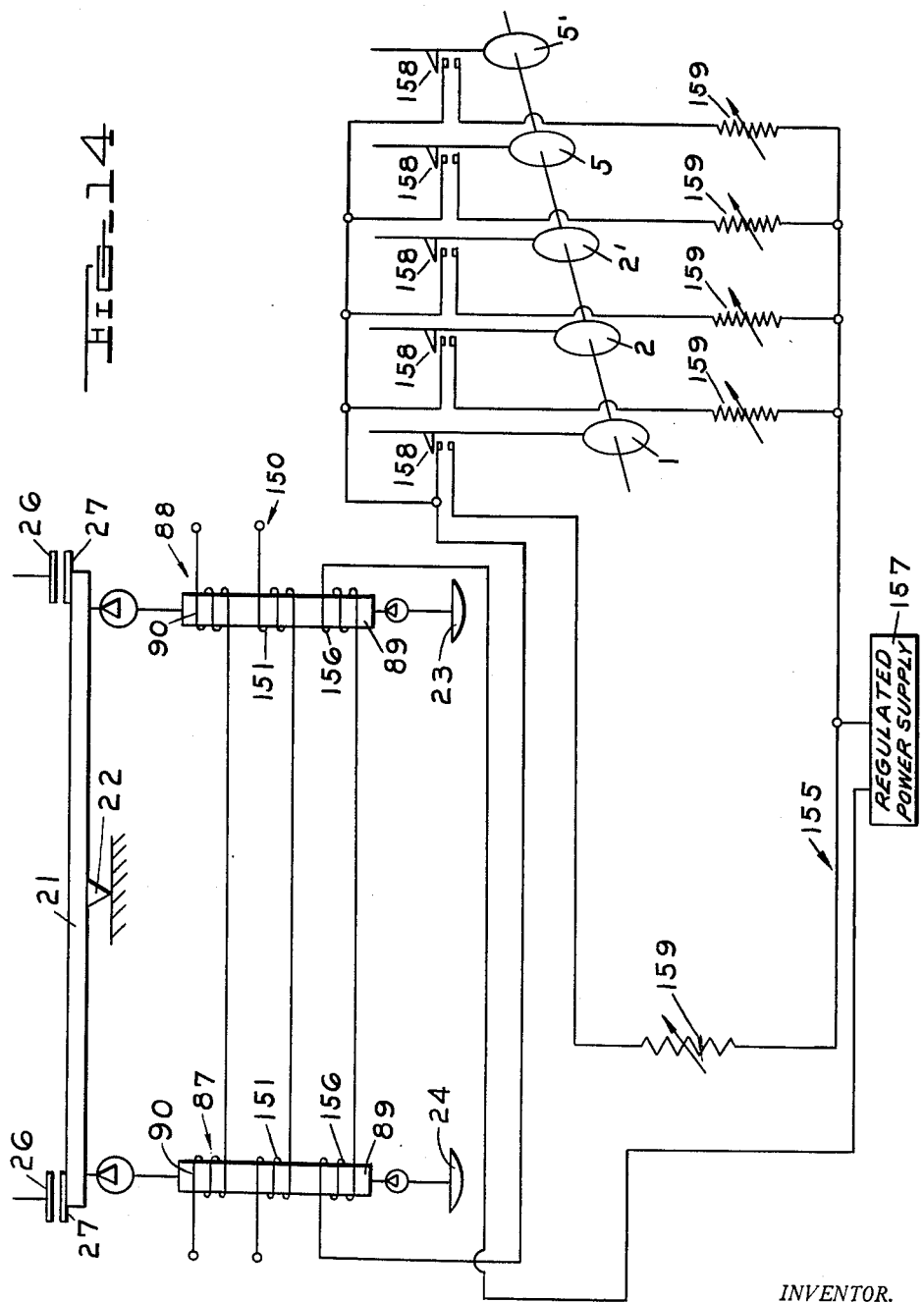

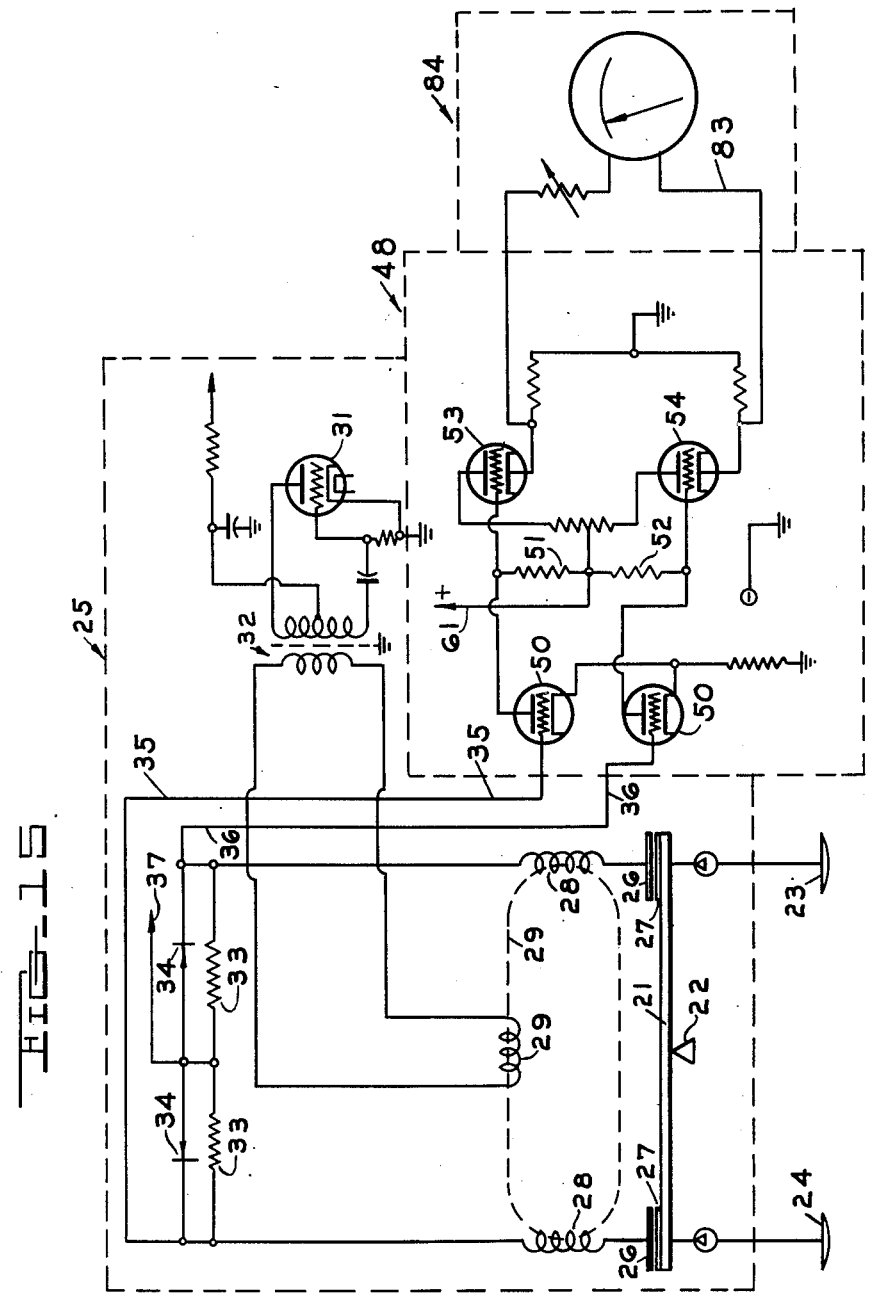

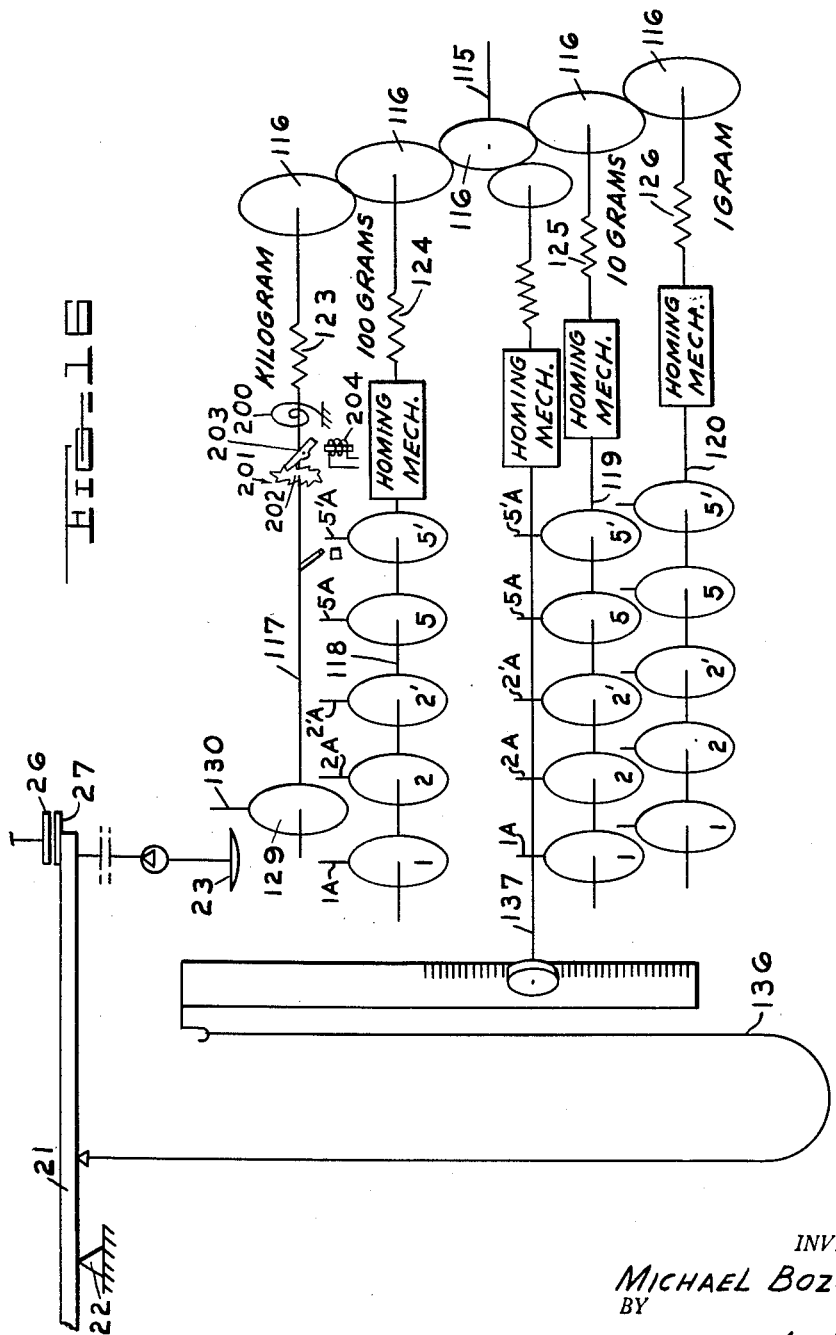

Patented June 1, 1954

2,680,012

UNITED STATES PATENT OFFICE 2,680,012

ANALYTICAL BALANCE

Michael Bozoian, Ann Arbor, Mich., assignor, by mesne assignments, to Eberbach Corporation, a corporation of Michigan Application January 26, 1948, Serial No. 4,220

34 Claims. (Cl. 265—27)

This invention relates generally to weighing machines and refers more particularly to improvements in analytical beam type balances.

An object of this invention is to provide a balance rendering it possible to weigh unknown loads automatically in less time and with greater precision than heretofore thought possible with orthodox manually operable precision balances. With a balance embodying the features of this invention, it is only necessary for the operator to place the unknown load upon the balance pan and to manipulate a suitable starting control. Immediately upon manipulation of the starting control, a series of operations are automatically effected in their proper sequence and the weight of the unknown load on the beam is directly indicated by an indicator. Thus the chance of human error is reduced to a minimum, and the balance may be operated to weigh unknown loads with extreme accuracy.

A more detailed object of this invention is to provide a displacement detector operable to translate deflection of the beam from gravitational equilibrium into an electric signal having a magnitude proportional to displacement of the beam and having a polarity dependent upon the direction of movement of the beam about its support.

Another object of this invention is to utilize the inverse feed back system for stabilizing the balance by providing a servo motor electromagnetically coupled to opposite ends of the beam in a manner to oppose deflection of the beam by the unbalanced load on either of the beam pans.

Still another feature of this invention is to magnify the electrical signal produced by the detector with a servo amplifier having the input side electrically connected to the detector through an "anti-hunt" circuit and having the output side electrically connected to the servo motor through a "range selector" circuit. The "anti-hunt" circuit electrically anticipates and minimizes "hunting" of the servo systems by modifying the dynamic character of the input signal into the servo amplifier by a leading phase shift circuit, and thereby reduces destructive mechanical vibration of the balance beam to a negligible value.

The so-called "range selector" circuit embodies a plurality of resistors fixed and adjustable, which are connected in series and/or parallel between the output of the amplifier and the input of the servo motor. The resistors correspond to different weighing ranges, and it is a further object of this invention to consecutively connect the resistors in circuit with the servo motor in accordance with the voltage at the output side of the amplifier so that the opposing force applied to the beam is a function of the unknown load on the beam.

A further object of this invention is to provide circuit means between the output of the range selector circuit and the input of the servo motor enabling compensating for the sensitivity error. This error is a direct function of the load on the balance beam, and becomes apparent as a decrease in beam deflection for a given weight. It is the function of the compensating circuit to integrate the incoming signals in a manner such that the sensitivity error is completely compensated for.

A still further object of this invention is to connect an electrically operated meter in the output circuit of the "range selector" circuit calibrated in weight units and operable to indicate an unknown weight on the balance beam.

Another feature of this invention is to provide a "servo counter" circuit energized by the output voltage of the amplifier and embodying a member movable step by step throughout a predetermined path of travel. By virtue of the above general circuit arrangement, the amplifier voltage output is directly proportional to the unknown load for each weighing range and the distance the member moves is, therefore, dependent upon the unknown load.

Still another object of this invention is to provide weight applying mechanism operable by the member to selectively apply different weights to the beam depending upon the extent of movement of the member or upon the output voltage of the amplifier.

A further feature of this invention is to couple the weight applying mechanism to a number wheel indicator which functions to integrate the numerical value of the weights used to establish gravitational equilibrium of the beam. This wheel may be used in conjunction with the meter noted above to display the exact weight of the unknown load on the beam as will be described more in detail below.

A still further feature of this invention is to provide an arrangement responsive to operation of the number wheel to correct beam errors and to incorporate additional means operated by the weight applying means to compensate errors in the individual weights. Thus unequal lengths of the beam arms and inaccuracies of the actual weights do not affect the accuracy of the balance. This is important in that it enables obtaining precision balance operation with weights formed within practical tolerances, and eliminates the necessity of frequent checks on either the weights or balance beam.

The foregoing as well as other objects will be made more apparent as this description proceeds, especially when considered in connection with the accompanying drawings, wherein:

Figure 3 is a circuit diagram of the range selector;

Figure 4 is a circuit diagram of the power supply unit;

Figure 5 is a circuit diagram of the servo counter;

Figure 6 is a diagrammatic perspective view of the weight operating mechanism;

Figure 7 is a diagrammatic perspective view of the weight loading mechanism;

Figure 8 is a diagrammatic elevational view of the weight indicating wheel assembly;

Figure 9 is a diagrammatic perspective view of the program apparatus and showing a part of the range selector in conjunction with the program apparatus;

Figures 10, 11, 11A and 12 are elevational views of the weight actuating cams;

Figure 14 is a diagrammatic view showing an arangement enabling inaccuracies in the weights to be compensated for;

Figure 15 is a circuit diagram showing a modified form of control for the balance;

Figure 16 is a diagrammatic perspective view of a modified form of weight loading apparatus.

Figure 1:
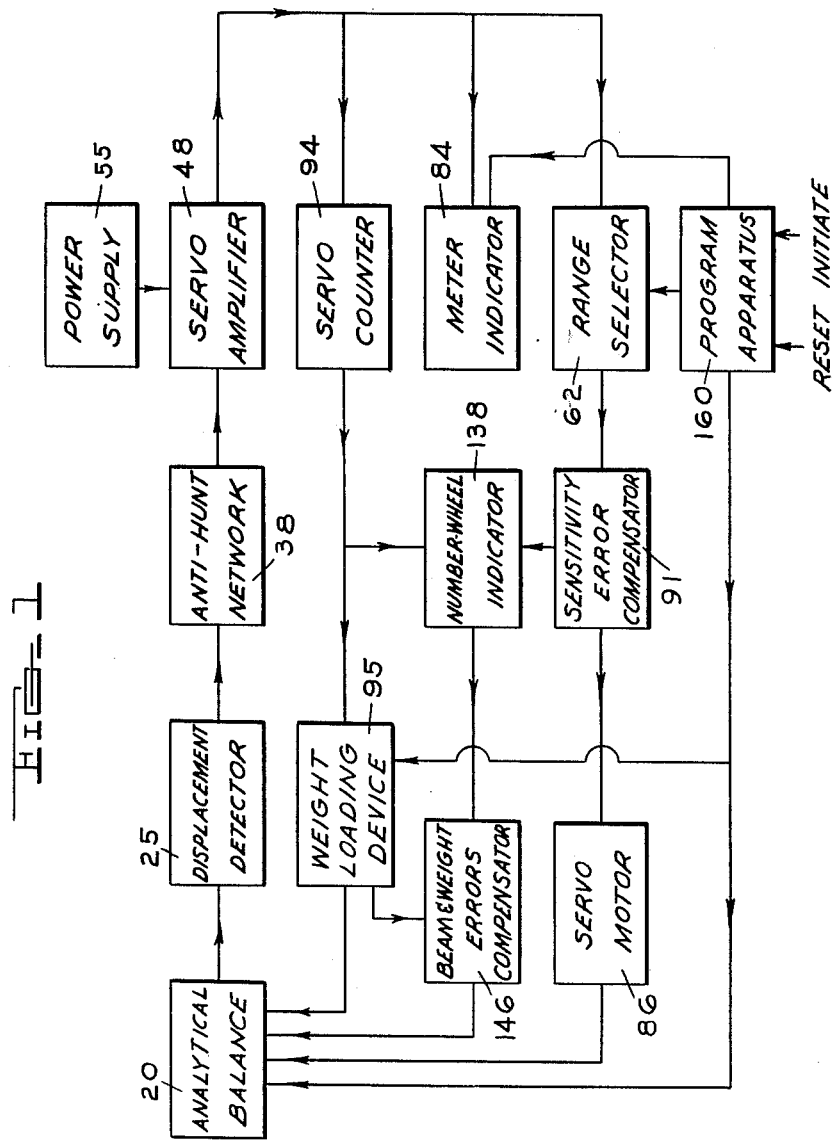
Figure 1 is a block diagram indicating a number of the units employed to produce automatic operation of the balance.
Figure 2:
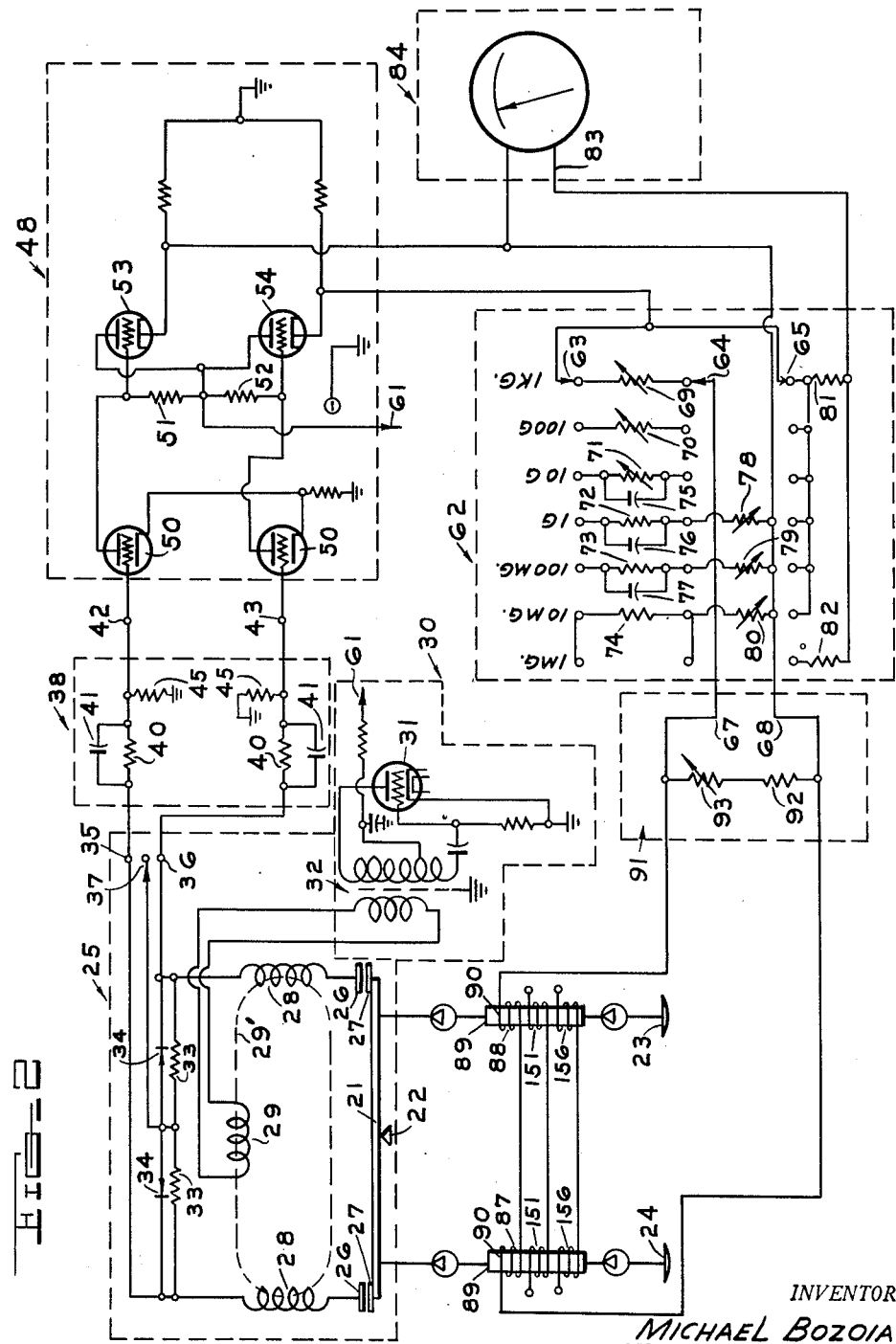
Figure 2 is an electrical diagram of certain parts of the balance control equipment.

This invention is shown for the purpose of illustration as used in connection with weighing machines of the type commonly known as analytical balances. This general type of balance is indicated in Figure 1 of the drawings by the box 20 and comprises a number of parts which form no part of this invention. In the interests of simplicity, therefore, only those parts of the balance required for illustration purposes are shown and these parts are merely diagrammatically illustrated. Referring to Figure 2 of the drawings the numeral 21 designates a beam pivoted intermediate the ends on a bearing 22 and having load supporting pans 23 and 24 suspended from opposite ends of the beam.

*Displacement detector*

The block 25 in Figure 1 of the drawings indicates a displacement detector which translates deflection of the beam 21 caused by the application of an unknown load on one of the pans into an electrical signal. Referring to Figure 2 of the drawings, the detector embodies a capacitance bridge comprising fixed plates 26 and movable plates 27. The plates 27 are respectively secured to opposite ends of the beam 21 and the plates 26 are fixedly supported in any suitable manner directly opposite the movable plates 27. The fixed plates 26 of the bridge are respectively connected to one of the ends of suitable coils 28 symmetrically arranged with respect to an intermediate coil 29 and inductively coupled to the latter by an air path designated by the numeral 29'. The opposite ends of the coil 29 are electrically connected to a conventional type of electronic oscillator designated generally by the numeral 30 and operable to supply alternating current into the capacitance bridge. Briefly the oscillator embodies an electron tube 31 connected in circuit to the primary coil of a transformer 32 having the secondary coil connected to the coil 29.

Connected in series with the coils 28 are a pair of resistors 33 and each resistor is shunted by rectifier elements 34. The rectifier elements produce equal and opposite direct current voltages across the resistors 33 when the balance beam is at gravitational equilibrium. The coils 28 are also respectively connected to output terminals 35 and 36, which in turn, are electrically connected to the input circuit of a suitable servo amplifier about to be described. In order to enable electrically connecting the terminals 35 and 36 directly to the grids of electron tubes in the input circuit of the servo amplifier, provision is made for applying a direct current bias voltage to the capacitance bridge. This direct current voltage is supplied to a third terminal 37 by a power pack also to be presently described.

It will be understood from the above that the electronic oscillator 30 or the source of alternating energy is inductively connected through the coils 28 to two legs of the capacitance bridge, and the juncture of these legs is coupled to the terminal 37, which is shown in Figure 4 of the drawings as also connected to ground through the lower leg 60 of the voltage divider. The other two legs of the bridge are formed by the beam 21 which is capacitatively connected to ground by the inherent stray capacitance of the beam. This is the equivalent of grounding the fulcrum 22 and enables employing accepted balance construction, wherein the fulcrum is formed of agate, sapphire or some equivalent wear resisting material other than metal. Such materials possess high electrical insulation qualities, and consequently the fulcrum of orthodox balances cannot be directly connected to ground by an electrical conductor. The beam of the orthodox balances is formed of metal and accordingly may be connected to ground by an electrical conductor. However in precise analytical balances such practice is prohibitive, because the conductor, regardless of its size, tends to destroy the sensitivity of the balance, and renders the balance useless in the milligram range, for example.

It follows from the foregoing that the displacement detector is composed of two similar circuits, each having a capacitor (26 and 27), coils 28 and a resistance 33 shunted by a half-wave rectifier 34. Each capacitor has a stationary plate 26 and a movable plate 27 carried by the beam 21. The coils 28 are inductively coupled to the alternating current source 30 by the coil 29. The return path for each branch of the displacement detector is electrically complete because the junction between the two resistors 33, shunted by the rectifiers 34, and the junction between the moving plates of the capacitors are connected together (as far as the alternating current is concerned). This is true because the junction between the resistors 33 is returned to ground via the terminal 37, and the junction between the moving plates of the capacitor is returned to ground by virtue of the stray capacitance of the beam 21 to ground. The output terminals of the detector are connected across the opposite ends of the two resistors 33. The rectifiers 34, shunted across the resistors 33, are connected back to back in series opposing relationship across the terminals. Thus, when the beam 21 is in equilibrium, equal and opposite direct current voltage is developed across the resistors 33 and the output is zero. On the other hand, when the beam 21 is not in equilibrium the impedance of one capacitor is reduced while the impedance of the other capacitor is increased. In consequence of this impedance change, the rectified voltage drops across the two resistors 33 are not equal and a direct current output signal results with a magnitude dependent upon the extent of beam movement and a polarity dependent upon the clockwise or counterclockwise travel of the beam from equilibrium.

It follows from the foregoing that minute displacements of the balance beam 21 increase the capacitance of one capacitor and decrease the capacitance of the other capacitor. When the beam 21 is in equilibrium, the direct current voltage developed across the terminals 35 and 37 exactly counterbalance the direct current voltage across the terminals 37 and 36. Minute displacements of the beam 21 generate direct current voltages of negative or positive polarity between the terminals 35 and 36, depending upon the direction in which the beam is displaced. Thus the output of the displacement detector, across the terminals 35 and 36 is a direct current voltage proportional to the displacement of the beam and having a polarity depending upon the direction of displacement.

*Anti-hunt network*

The block 38 in Figure 1 of the drawings indicates a corrective circuit which is referred to herein as an anti-hunt network. It will be understood as this description proceeds that the operation, stability and accuracy of the automatic balance is made possible by a number of closed servo loops. It is characteristic of sensitive and high speed electro-mechanical servo systems to exhibit a phenomenon known as hunting. This so-called hunting, if not prevented, manifests itself as a destructive mechanical vibration of the balance beam and its associated system. It is the purpose of the anti-hunt circuit to anticipate and check hunting by modifying the dynamic character of the input signal to the servo amplifier, to be described presently. As shown in Figure 2 of the drawings, resistances 40 are respectively connected to the output terminals 35 and 36. These resistances are shunted by capacitive elements 41 and are connected to the output terminals 42 and 43 of the anti-hunt circuit. Capacitors 41 in conjunction with potential divider resistors 40 and 45 provide a leading phase shift circuit for the incoming signals.

*Servo amplifier*

The box 48 in Figure 1 of the drawings indicates an amplifier having the input side electrically connected to the output of the anti-hunt circuit 38 for magnifying the electrical signal to sufficient voltage and power levels to operate the power consuming components of the succeeding units of the automatic balance. Referring again to Figure 2 of the drawings, the output terminals 42 and 43 of the anti-hunt circuit 38 are respectively connected to the grids of a pair of voltage amplifier triodes 50 electrically connected in push-pull. This push-pull stage provides in a conventional manner across resistors 51 and 52 magnified voltage replica of the signal. This magnified voltage or signal is in turn applied directly to the grids of the triodes 53 and 54 connected to provide a push-pull cathode follower, power output stage. The lower output impedance of this type of stage provides the inherent electrical properties necessary for satisfactory damping of the servomotor to be presently described.

*Power supply*

The power supply is more or less conventional and is indicated in Figure 1 of the drawings by the box 55. This supply circuit shown in Figure 4 comprises generally an electrical transformer 56, rectifier tube 57, filter 58 and potential dividing resistors 59 and 60. The resistors 59 and 60 are connected across the ground and terminal 61. This terminal is connected to the resistors 51 and 52 in the amplifier, and is also connected to the plates of the amplifiers 53 and 54. The arrangement is such that a relatively high, direct current voltage is available across the terminal 61 and ground sufficient in magnitude to energize the various electronic circuits incorporated in the balance control system. The adjacent ends of the resistors 59 and 60 are connected to the terminal 37 with the result that a relatively small direct current voltage is available across the terminal 37 and ground which is sufficient to polarize the capacitance bridge in the detector circuit. The various windings W1, W2, W3 and the leads L1 and L2 are provided to supply alternating current power where needed.

*Range selector*

It is neither economical nor practical to design the components of the automatic balance to possess an accuracy greater than 1 to 3 per cent. However, in analytical balance work, it is frequently necessary to weigh unknown loads up to 200 grams to within 1/20 milligram, or in other words, to one part in four million. The technique used in the automatic balance to achieve this degree of over-all accuracy is to divide the weighing operation into seven decade ranges as follows: (1) the kilogram range, (2) the 100 gram range, (3) the 10 gram range, (4) the 1 gram range, (5) the 100 milligram range, (6) the 10 milligram range, and (7) the 1 milligram range.

The accuracy of the automatic weighing in any one of the above ranges is designed for practical reasons to be within 1 to 3 per cent. The weighing procedure starts with the kilogram range and progresses automatically through to the one milligram range. Thus any error in measurement that may occur in a preceding range is multiplied ten times in the succeeding range, thereby facilitating economical instrumentation for detecting and correcting or compensating for such error.

This range selecting function is the duty of the circuit arrangement indicated in Figure 1 of the drawing by the block 62. As also shown in Figure 2 of the drawings, the output of the servo amplifier 48 is connected to the input side of the range selecting circuit which includes a seven position (1 kg. through 1 mg. inclusive) switch having three decks indicated by the numerals 63, 64 and 65. As more clearly shown in Figure 9 of the drawings, each deck of the switch comprises a rotatable contact 66 and seven stationary contacts indicated by the indicia 1 kg., 100 g., 10 g., 1 g., 100 mg., 10 mg. and 1 mg. symmetrically disposed about the common axis of rotation of the respective contacts 66 for successive engagement by the latter. The three contacts 66 are connected together for rotation as a unit and are operated by program apparatus to be later described in detail. The switch decks 63, 64 and 65 successively introduce into the range selector output terminals 67 and 68 series and series parallel fixed and adjustable resistors. The series resistors comprise items 69, 70 and 71; the series parallel resistors comprise the pairs 72 and 78; 73 and 79; and 74 and 80. The adjustable resistors 69 to 71 inclusive and 78 to 80 inclusive are used as calibration means for each individual range. Furthermore, capacitances 75 to 77 inclusive used in parallel to resistors 71 to 73 respectively, and the calibration resistors 78 to 80 inclusive used in parallel to the output circuit promote critically damped response of the balance.

The resistors 69 to 74 inclusive are successively connected in series with the output terminals 67 and 68 by the three deck switch. Additional resistors 78, 79 and 80 of the adjustable type are in shunt with the output terminals 67 and 68, and are respectively connected to the resistors 72, 73 and 74. By means of these controls, each range may be calibrated so that the servo amplifier output is, for example, 100 volts for the full load of that range. As noted above this calibration is achieved by the series of adjustable resistors 69, 70 and 71 for the relatively heavy load ranges of 1 kg., 100 g. and 10 g. respectively, and by series-parallel resistors (72 to 74 and 78 to 80, respectively) for the smaller load ranges of 1 g., 100 mg., 10 mg. and 1 mg. The reasons for the series-parallel adjustable resistor type of control are two in number: (1) to avoid extremely high ohmic resistors which are expensive and not as stable as wire wound controls; and (2) to take advantage of the parallel component of the control as additional damping means on the servomotor.

The function of the switch deck 65 is to introduce either multiplier resistor 81 or 82 into an indicator circuit 83. The resistor 81 is ten times greater, ohmically, than the resistor 82 and is adapted to be successively connected in the indicator circuit 83 by the switch deck 65 for each decade range noted above except the one milligram range. When this final range is connected to the output of the servo amplifier, the switch deck 65 connects the resistor 82 in the indicator circuit. This arrangement increases the sensitivity of the indicator circuit ten times and enables using the greater power of the ten milligram range for the one milligram range. In other words the resistors 74 and 80 for the ten milligram range may also be used when the three switch decks are in their final positions at the one milligram range.

*Meter indicator*

The block 84 in Figure 1 of the drawings designates a meter. This meter is connected in the circuit 83 and is of the one milliampere type which, in conjunction with the multiplier resistors 81 and 82, becomes a 1000 ohm/volt voltmeter indicator. The dial scale of the meter is preferably calibrated in gram or milligram units suitable for the range desired to be covered.

*Servo motor*

The block 86 in Figure 1 of the drawing indicates a torque motor rendering it possible to utilize the inverse feed back system of stabilizing the automatic balance. This motor applies a torque or couple to the balance beam 21 which is opposite and slightly less than the torque or couple applied to the beam by the load on the latter. As will become apparent from the following description, the servomotor applies an opposing torque to the beam 21 without physical connection to the beam and thereby preserves the sensitive characteristics of the beam for weighing operations.

In detail the servomotor comprises two solenoids 87 and 88 respectively associated with opposite ends of the beam 21. Each solenoid in turn comprises a permanent bar magnet 89 and a coil 90 encircling the bar. The bars are respectively suspended from opposite ends of the beam 21 in any suitable manner with like poles at corresponding ends thereof in order to minimize external magnetic effects. The lower ends of the coils 90 are electrically connected together and the upper ends of the coils are respectively connected to the output terminals 67 and 68 of the range selector. Thus the application of electrical power to the coils 90 produces a clockwise or counterclockwise torque on the balance beam 21, depending upon the polarity of the input voltage.

*Sensitivity error compensator*

The unit is designated generally in Figure 1 of the drawings by the box 91 and comprises the circuit shown more in detail in Figure 2 of the drawings. Even in the finest analytical balances, there are a number of sources of errors which are difficult, if not prohibitive, as far as cost is concerned to correct or compensate. One such error, identified as the sensitivity error, is a direct function of the load on the balance beam and becomes apparent as a decrease in beam pointer deflection for a given unit weight. For example in a typical analytical balance, unloaded, the beam pointer deflects ten divisions upon the pointer index when one milligram is placed upon the load pan. However, when the balance is loaded with 200 grams per pan, its rated full load, the beam pointer deflects eight divisions from gravitational equilibrium when the same one milligram is placed upon the load pan.

This decrease in sensitivity, for an increased load upon the balance beam, is very difficult to correct or compensate in present day balances, and is the chief reason that direct reading projection type pointer index devices are not popular. It is the function of block 91, interconnected as shown in Figure 2, to integrate the incoming signals in such a manner that the sensitivity error is compensated for in the output voltage to the servomotor.

In detail the foregoing is accomplished by connecting two resistors 92 and 93 in series across the input to the servomotor 86. The resistor 93 is an adjustable rheostat element with an ohmic value determined by rotation of its control shaft. The resistor 93 is automatically adjusted in proportion to the load on the balance beam 21, and this is accomplished by operatively connecting the control shaft to the counter or wheel to be more fully hereinafter described for indicating the units of weight loaded on the beam by the weight loading apparatus also to be later described. The resistor 92 is placed external to the resistor 93, and is a means for spreading the control range of the latter resistor.

*Servo Counter*

For the purpose of this description, the equipment in blocks 20, 25, 38, 48, 55, 62, 91 and 86 may be considered the primary servo loop. This arrangement makes it possible for the servo amplifier 48 to have an output voltage directly proportional to the unknown load on the beam for each decade range. This output voltage is applied to a secondary servo loop comprising the mechanism in blocks 20, 25, 38, 48, 55 (previously described), and in blocks 94 and 95 to be presently described. Included in the secondary servo loop is a shaft driven by an electronically controlled motor which is operated by the amplifier output voltage to angularly position the shaft in a discreet, step-wise manner directly proportional to the units weighed, less one unit, in existing decade range.

The above is accomplished by the servo counter indicated generally by the block 94 in Figure 1 of the drawings and shown in detail in Figure 5 of the drawings. The electronically controlled motor referred to above is indicated in Figure 5 of the drawings by the numeral 96 and the shaft driven by this motor is designated by the reference character 97. The motor 96 is a reversible shaded pole type, and, in addition to driving the shaft 97, also imparts rotation to a wiping contact arm 98. The free end of the arm 98 is adapted to successively engage sixteen contact points P0 through P15 which are equally spaced about a circle described by the free end of the arm 98. The initial contact position or "home" is identified by contact point P0. This contact point is connected to ground by means of two series-connected resistance elements R17 and R18, R17 being adjustable for calibration purposes. The contact points are interconnected by equal resistance elements R19 to R33 inclusive having ohmic values equal in turn to R18.

Contact point P15 is connected by lead 99 to a voltage regulated power supply represented by the circuit 100. This may be any suitable electronic regulator, such as the one diagrammed, capable of maintaining the output voltage constant within close limits.

In Figure 5 the voltage regulator circuit 100 obtains its direct-current power from lead M which terminates in the power supply of Figure 4. Because of the connection 99, the voltage drops between contact points P0 to P1, P1 to P2, P2 to P3, etc., are maintained substantially constant and equal to each other and may have a value of say 10 volts. Hence with the wiper in the "home" position shown, it is approximately positive 10 volts, direct-current, above ground.

The wiper is connected to one position Y1 of a double-pole triple-throw switch 101, 102 by means of a lead 103. The normal position of the poles of this switch are as shown in Figure 5 with pole 104 engaging position Y1 and 105 engaging position Y2.

The poles of the double-pole triple-throw switch are joined by the terminal leads of the capacitor 106 identified further as a "memory" capacitor. In the X1—X2 position, the capacitor 106 is charged by voltage from the output side of the amplifier through resistor R34. In the position Z1—Z2, the capacitor 106 is discharged into resistor R35.

From terminal Y2 the circuit leads to a resistance-capacitance time-delay and filtering network composed of resistor R36 and capacitor 107. The purpose of this network is to minimize spurious transients and power-supply-frequency signals from actuating the control grid of the thyratron tube 108.

The thyratron tube 108 is normally conducting, powered by the alternating current supply provided by transformer 109 whose primary side is excited by a convenience outlet via leads L1 and L2. The conductive current of 108 provides a negative voltage drop across the resistor R37 and capacitor 109, and is applied through resistor R38 to the control grid of the thyratron tube 110 rendering it normally non-conductive. The tube 110 is energized by means of a transformer 111 having its primary leads connected to one of the shaded-pole windings W5 of the electronically controlled motor 96.

The reversible shaded-pole motor 96 has its primary winding W4 energized from the power line via leads L1—L2. The two shaded-pole windings W5 and W6 are normally open and should either winding be individually closed, the motor rotor will rotate in a clockwise or counter-clockwise direction depending upon which winding is closed. In the automatic balance, winding W5 is electronically closed when desired by making the thyratron tube 110 conducting. This condition effects rotation of the motor rotor and the coupled driven shaft 97 in a clockwise direction.

In order to move the wiper to the "home" position, the winding W6 of the motor is energized by a switch 112 forming a part of the program apparatus to be presently described. This allows rotation of the motor rotor in a counter-clockwise direction until cam 113 opens a switch 114 included in the circuit of winding W6. In the actual construction the cam 113 is operated by the shaft 97 in a manner such that the switch 114 is opened when the wiper 98 reaches the contact point P0 or "home" position. When the shaded-pole windings W5 and W6 of the motor 96 are both open, the motor rotor, as well as the shaft 97, is dynamically braked due to the energized motor field winding W4.

The principle of operation of the servo counter is as follows: With the automatic balance in any one of its decade ranges the double-pole triple-throw switch 101, 102 is momentarily operated (by the program apparatus to be presently described) to the position X1—X2 where the condenser 106 is charged substantially to the servo amplifier output for that range. The resistor R34 with the capacitor 106 insures that the charged level is an average servo output and not a spurious or transient peak due to momentary shock or vibration to the automatic balance. Upon completion of this operation the switch 101, 102 is again operated to return the switch poles to the Y1—Y2 position shown in Figure 5 of the drawings wherein the charged capacitor is placed in the grid circuit of the thyratron tube 108. The negative polarity of the charge on capacitor 106 tends to extinguish conduction of the thyratron tube 108. However, since the position Y1 is also in the grid circuit and is approximately positive 10 volts above ground, the thyratron tube 108 will not extinguish unless the charge on the capacitor 106 is greater than 10 volts. By adjusting the potential of P0 by the control resistor R17, the voltage on the capacitor 106 which will just extinguish the tube 110 can be predetermined. The control resistor R17 is also used to compensate for small manufacturing differences in the thyratron tube 108.

In the automatic balance it is desirable that the servo-counter always "counts" or rotates one position less than the actual units of weights on the balance for that range. The reason for under-counting or under "guessing" of the load is that it is more economical to correct for such errors in the "guess" by adding weights than by removing the same. In other words the mechanism of the automatic balance is designed to be a forward, additive process rather than an additive and subtractive or reversible process.

Since in any decade range each unit of weight may represent 10 volts and since the position P0 is approximately 10 volts, the thyratron tube 108 cannot be extinguished unless the condenser charge is greater than 10 volts. It will be recalled that this condenser potential is directly proportional to the servo amplifier output and hence proportional to the load on the balance. As a specific example: if the automatic balance is operated on the grams decade range and there are 8 grams on the balance beam, the servo amplifier output will be 80 volts. This 80 volt level can be "memorized" by capacitor 106 by first moving the switch 101, 102 into position X1—X2 and by subsequently returning the switch to position Y1—Y2, or normal. This places into the grid circuit of tube 108 a net bias of negative 70 volts with respect to the cathode of tube 108 which is the reference and ground. Ten volts are subtracted, because P0 is approximately positive 10 volts above ground. Since the tube 108 has its grid biased to negative 70 volts, the tube ceases conducting current, and the bias voltage produced across the resistor R37 and condenser 109 disappears.

As a result of the above, the tube 110 conducts energizing the winding W5 through the transformer 111. When the winding W5 of the motor 96 is energized, the shaft 97 rotates in a clockwise direction causing the wiper 98 to successively engage contact points P1, P2, etc. When the wiper 98 engages the contact point P1, for example, the net grid bias for the tube 108 is reduced 10 volts and is negative 60 volts. Moreover, each engagement of the wiper with the successive contact points reduces the net voltage by 10 volt increments. Finally when the wiper 98 engages the contact P7 the net grid bias is zero volts and the tube 108 is rendered conductive, again biasing the tube 110 to the non-conductive state. When the tube 110 is non-conductive the motor 96 is dynamically braked to a quick stop because the field winding W4 is continuously energized.

It will be noted from the foregoing that the electronic circuit of Figure 5 is in itself a servo system positioning the wiper 98 and hence the shaft 97 so that a contact point (P0 through P15) is selected having a potential approximately equal to the charged potential level on the memory capacitor 106. The purpose of resistor R39 is to provide a conductive path to ground for the control grid circuit of the tube 108 during that period of time that the wiper travels from one contact point to the next. This high resistance conductive path permits stable operation of the servo counter in its hunt for the proper angular position necessary to balance out the memory condenser voltage.

There is still to explain the "gating" action of the servo counter, the "go" or "no-go" feature which provides economical and positive counting of the unit weights, less one. As described above the contact point P0 is approximately 10 volts above ground potential and any weight less than a unit weight on any range will be unable to extinguish the thyratron tube 108. Thus the motor 96 is prevented from rotating the shaft 97 and wiper 98. It will also be noted that one unit weight places a potential of 10 volts on the memory condenser 106 and, since the contact point P0 is substantially 10 volts, it follows that the tube 108 would still conduct current and the net grid circuit voltage is zero.

The control ratio of the tube 108 is such that approximately negative three-quarters to one volt net bias applied to the control grid circuit will cause the tube to cease conducting. Thus by adjusting the resistor R17 and thus the positive potential of all the contact points with respect to ground, the unit voltage level necessary to "index" the wiper can be predetermined. In this application R17 is adjusted so that it requires 1¼ units of weight, plus or minus 0.2 unit before the wiper "indexes." That is, on the 10 gram decade range, for example, the wiper will not index for 10 grams weight, may "index" one position for 10.05 grams, and must "index" one position for any weight above 10.45 grams. This tolerance has been set up to insure a count of one less than the total units weighed in any range. It is necessary to use fifteen units for each decade range to provide complete additive coverage for a "bad" guess in any preceding range. The "gating" action described makes possible economical and accurate over-all automatic weighing.

After each servo count operation for any range, the memory capacitor 106 is discharged into resistor R35 by moving the switch to position Z1, Z2 to prepare this capacitor for the next weighing operation.

Weight loading device

As will be more fully hereinafter described, the servo counter driven shaft 97 is mechanically coupled to the weight loading device indicated generally in Figure 1 of the drawings by the reference numeral 95 and shown in detail in Figure 6 of the drawings. Briefly the servo counter shaft 97 is adapted to be selectively connected to one of six counter shafts embodied in the weight loading device, and respectively corresponding to the kilogram decade range, one hundred gram decade range, ten gram decade range, one gram decade range, one hundred milligram decade range and the ten milligram decade range. Supported on the above shafts are suitable cams for operating pusher bars which in turn serve to automatically load weights on the beam to balance the unknown weight for each decade range.

In detail it has been noted above that the angular position of the servo counter shaft 97 is proportional to the unit weights measured in any decade range minus one. Furthermore, because of the tolerance limits of plus or minus 0.2 unit weight used for the "go-no go" gating action, fifteen standard weights will be necessary for each decade range, except the kilogram range. In order to avoid handling a multiplicity of weights, it is preferred to employ a technique which may be identified as the 1—2—2—5—5 system. This means that for each range, except for the kilogram range, five weights having values of 1, 2, 2, 5 and 5 properly loaded can result in any desired value from one through fifteen. The kilogram range is excepted because it is only necessary in this range to determine whether or not a one hundred gram standard weight shall be applied to the beam. Thus in order to cover the kilogram, the hundred gram, the ten gram, the one gram, the 100 milligram and the ten milligram ranges, a total of twenty-six weights are required. These standard or reference weights must be actuated in the proper sequence by the servo counter at the direction of a suitable program apparatus which will be presently described in detail.

In Figure 6 of the drawings, a shaft 115 is shown and this shaft is coupled in any suitable manner to the servo counter shaft 97 for rotation as a unit with the latter. The shaft 115 is in turn coupled by pinions 116 to six shafts 117, 118, 119, 120, 121 and 122 in a manner to rotate the latter at the same speed as the servo counter shaft 97. These six shafts respectively correspond to the kilogram decade range, 100 gram decade range, 10 gram decade range, one gram decade range, 100 milligram decade range and the 10 milligram range. The shafts 117 to 122 inclusive are connected to their respective driving gears by electromechanical clutches 123, 124, 125, 126, 127 and 128 which are selectively operated by the program apparatus to be presently described.

Referring again to Figure 6 of the drawings, it will be noted that a cam 129 is secured to the kilogram shaft 117 for operating a pusher bar 130 which, in turn, manipulates a ring type reference weight 131 of 100 grams. As shown in Figure 7 of the drawings, a hanger 132 is suspended from the right hand end of the balance beam 21 and a weight carrier 133 having fingers 134 is supported on the hanger for vertical movement relative thereto. The ring weight 131 is carried by the fingers 134 and is adapted to be supported on fingers 135, projecting outwardly from the hanger, in response to downward movement of the carrier relative to the hanger. It will, of course, be understood that upward movement of the carrier 133 lifts the ring weight 131 off the hanger or balance beam.

Secured on each of the remaining shafts 118 to 122 inclusive are five cams identified by the weight units 1, 2, 2', 5 and 5'. Each cam is engaged by a pusher bar 1A, 2A, 2'A, 5A and 5'A. Thus the weight loading apparatus embodies twenty-six pusher bars counting the kilogram bar 130. As stated above the pusher bar 130 applies a weight ring 131 to and removes the same from the hanger 132 on the beam by parts 133 and 135. These parts are duplicated for each pusher bar as indicated in Figure 7 of the drawings, wherein six of the twenty-six weight operating parts are shown. The remaining twenty weight loading parts are identical and need not be shown. It will suffice to point out that each group of five weight loading parts corresponds respectively to the 100 gram range, the 10 gram range, the 1 gram range, the 100 milligram range and the 10 milligram range. The 1 milligram range is not considered as this unit of weight may be read directly from the meter 94. The specific contour of the cams is shown in Figures 10, 11, 11A and 12 of the drawings. The 1A cam being shown in Figure 10, the 2A cam being shown in Figure 11, the 2'A cam being shown in Figure 11A, the 5A, 5'A cams are combined in actual practice and are shown in Figure 12 of the drawings.

*Alternative weight loading apparatus*

In order to avoid handling a large number of weights, the arrangement shown in Figure 16 may be resorted to. In this construction the standard weights up to 150 milligrams may be applied by a chain weight 136 connected to the right hand end of the balance beam 21 and operated by the counter shaft 115 through an auxiliary shaft 137. The torque thus produced upon the balance beam is equivalent to adding physical weights, and eliminates the necessity of handling the very small weights. The remaining parts of the loading apparatus shown in Figure 16 of the drawings are similar to the parts previously described in connection with Figure 6, and corresponding parts are designated by the same reference numerals.

*Number wheel indicator*

The weight loading apparatus is coupled to a number wheel indicator shown generally in Figure 1 of the drawings by the box 138 and illustrated more in detail in Figure 8 of the drawings. This indicator functions to integrate the numerical value of the standard weights used to establish gravitational equilibrium of the balance beam 21. The indicator presents the above weight value in six figures, three before and three after the decimal. The fourth place after the decimal is presented by the reading on the meter 94. Thus the unknown load on the balance beam 21 is evaluated to better than one part in four million for a two hundred gram load.

In detail the indicator comprises six wheels 140, 141, 142, 143, 144 and 145. Each wheel has applied to the periphery thereof the numerals 0, 1, 2, etc., through 9 spaced equal distances from each other. The wheels are independently rotatably supported, and are respectively coupled to the shafts 117 to 122 inclusive of the weight loading apparatus shown in Figure 6 of the drawings by any suitable means not shown herein. The arrangement is such that the number wheels are independently positioned at the desired numerals starting with the wheel 140 and working over to the wheel 145. Should any number wheel index past the numeral 9, the preceding wheel will index one step in accordance with conventional "Veeder Root" type counters. It will, of course, be understood that the usual means is provided on the counter for resetting the wheels to the zero positions when desired. The number wheel indicator is also coupled in any suitable manner to the adjustable resistor 93 in the error compensator circuit 91 for adjusting this resistor in proportion to the load on the balance beam. Any simple mechanical or electrical means may be employed to connect the resistor 93 to the number wheel indicator, and this disclosure is not complicated by a specific illustration of this means.

*Compensator for beam and weight errors*

Figure 13:
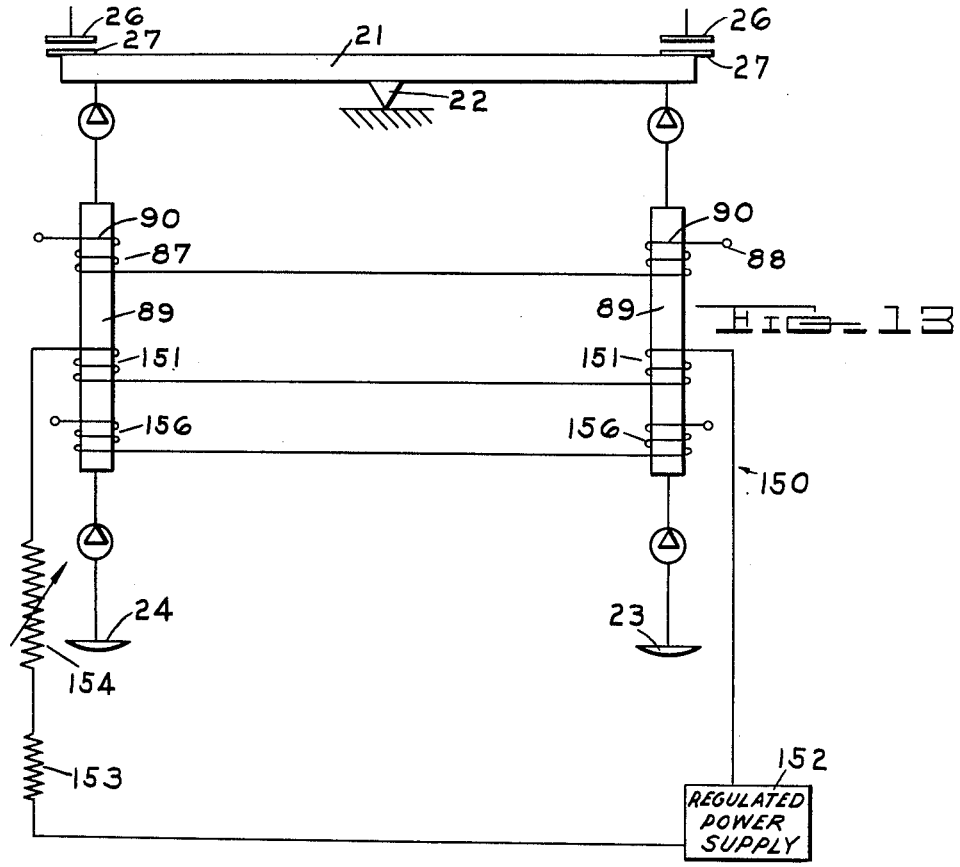
Figure 13 is a diagrammatic view showing one arrangement for correcting errors resulting from beam inaccuracies.

The circuit for accomplishing the above results are indicated generally by the box 146, and are shown in detail in Figures 13 and 14 of the drawings. Briefly it will be understood that another source of error in an analytical balance is caused by unequal length of the beam arms. Although this error may be as small as one part in 100,000 or less, nevertheless, for loads of 10 or 20 grams, it becomes greater than desired for accurate weighing. Another source of error that should be corrected in order to obtain precise weighing involves the accuracy of the physical weights employed. In accordance with this invention, the weights used need not be calibrated as precisely as weights employed in conventional analytical balances. In other words, with this invention, the weights used may be manufactured to nominal values within reasonable tolerances, because any error in the specific weights is compensated for by the circuit arrangement to be presently described.

Figure 13 of the drawings features a circuit 150 adapted to correct errors in the beam structure. In detail this circuit comprises a pair of coils 151 respectively encircling the magnetic core members 89 associated with the solenoids 87 and 88.

The lower ends of the coils 151 are electrically connected and the upper ends of the coils are connected to the output side of a direct current power pack designated generally by the box 152. Electrically connected in series with the coils is a fixed resistor 153 and an adjustable resistor 154. Inasmuch as the beam error is a function of the integrated weights loaded on the beam, the adjustable resistor shaft may be coupled to the number wheel indicator 138 for action by the latter. The connection between the adjustable resistor 154 and the number wheel indicator 138 is not specifically shown, but may be either mechanical or electrical, whichever is found more convenient.

The circuit arrangement shown in Figure 14 is provided for correcting errors in the values of the individual weights and is indicated generally by the numeral 155. This circuit also embodies a pair of coils 156 respectively encircling the magnetic cores 89 of the solenoids 87 and 88. The lower ends of the coils 156 are electrically connected together and the upper ends of the coils 156 are connected to a power pack 157. Connected in the circuit 155 are a plurality of switches 158 corresponding in number to the number of weights and respectively operated by the pusher bars shown in Figure 6 of the drawings. In order to simplify the disclosure, only five switches 158 are shown in Figure 14 in operative relation with the pusher bars for one group of weight actuating cams, and it is to be understood that this arrangement is duplicated for each group of cams. Also connected in the circuit 155 in series with the switches 158 are adjustable resistors 159 for controlling the flow of current from the power pack 157 to the coils 156. Thus the circuit 155 is energized each time one of the weights is loaded, and any error in the value of the weight applied is corrected.

*Program apparatus*

The program apparatus is indicated generally by the numeral 160 in Figure 1 of the drawings, and is shown more particularly in Figure 9 of the drawings. The purpose of the program apparatus is to operate the various parts of the automatic balance in their proper sequence, and to initiate the operation of the balance as well as provide for resetting the several parts subsequent to operation thereof. It will be understood that the program apparatus is merely diagrammatically shown in Figure 9 of the drawings, and that no effort has been made to show all of the parts of this apparatus. In the interests of simplicity, only sufficient structure is shown to afford an understanding of the function of this apparatus.

In detail a shaft 161 is shown in Figure 9 of the drawings as operated by an electronically controlled motor 162 similar to the servo counter motor 96 in that it is of the shaded-pole type having three windings 163, 164 and 165. The winding 164 is the field winding and is continuously energized from the power line when the balance is in operation. The winding 163 is one of the shaded-pole windings, and is electronically energized to cause rotation of the motor armature or shaft 161 in a clockwise direction. The winding 165 is the other shaded pole winding, and is energized through mechanical means when it is desired to rotate the motor armature or shaft 161 in a counterclockwise direction.

Outlined by the dotted lines in Figure 9 of the drawings is an electronic relay circuit 166 embodying a single pole double throw switch 167 having a position 168 (corresponding to the initiate position), and having a position 169 (corresponding to the reset position). When the switch is in the initiate position, 168, a circuit to the thyratron tube 170 is completed, and this tube is rendered conductive. Thus the motor winding 163 is energized, and the shaft 161 is rotated in a clockwise direction. Rotation of the shaft 161 in a clockwise direction imparts a rotation to the contact wiper 171 relative to the adjacent switch timer plate 172 and angularly moves the wiper 171 from the home position H into successive contact with the contacts K, K1, K2, and etc., corresponding in number to the number of instrumentalities of the balance to be automatically controlled by the program apparatus. The contacts K, K1, K2, and etc., are wired together and are connected to the grid of the tube 170.

Movement of the wiper 171 from one contact to the adjacent contact must be delayed for a period of time sufficient to enable the instrumentality of the balance represented by the contact to complete its task. In this connection it will be noted that contacts D are positioned between the contacts K, K1, K2, and etc. The contacts D are electrically connected together and to a source of negative potential 173 having the positive lead grounded. Through this ground connection the contacts D are electrically connected to the grounded side of a capacitor 174 having the opposite side connected to a brush 175. The brush bears against an insulated slip ring or sleeve 176 which also forms an anchor for the inner end of the wiper 171.

It follows from the above that as the wiper 171 leaves contact h (for example) to move to contact K, it brushes over contact d with the result that the capacitor 173 is charged to a large negative potential. When the wiper 171 arrives at contact K, this negatively charged capacitor is placed directly across the grid-cathode circuit of the tube 170, and the latter is biased to the off position. Thus the motor winding 163 is deenergized and rotation of the motor as well as the shaft 161 is dynamically braked.

Since different functions of the balance require different time intervals, two or more resistors 177 and 178 are provided to control the time intervals. In detail the capacitor 174 being negatively charged stops rotation of the shaft 161 and the negative charge discharges through resistor 177 and/or resistor 178. As a result the shaft 161 and associated switch gear complete a new line-up of circuits by rotating to another position. It will, of course, be understood that if the discharge path of capacitor 174 is through both resistors, the time delay is longer than if the discharge is through only resistor 177. For some functions of the apparatus, only short time delays are required and in such instances the resistor 178 is shorted to ground by a switch gear 179. This switch gear 179 comprises a switch plate 180 and a wiper 181 connected to the shaft 161 for rotation thereby to successively engage suitable contacts 182 on the plate 180. These contacts are electrically connected together and are connected in the relay circuit between the resistors 177 and 178. The wiper 181 is grounded so that each time it engages a contact 182 on the plate 180, the resistor 178 is shorted, hastening discharge of the capacitor 174. Thus conduction of the tube 170 is reestablished and rotation of the shaft 161 to the next position is accomplished.

One of the instrumentalities controlled by the program apparatus is the three deck switch in the range selector 62. The three decks 63, 64 and 65 are shown in Figure 9 of the drawings as having the wiper contacts 66 insulated from and rotatable as a unit with the shaft 161. The wipers 66 are electrically connected in the circuit by insulated contact sleeves 183 and brushes 184 bearing against the sleeves 183. The outer ends of the wipers successively engage contacts 185 supported on the peripheral portions of the three plates 186, 187 and 188, and corresponding respectively to the kilogram, 100 gram, 10 gram, 1 gram, 100 milligram, 10 milligram and 1 milligram ranges.

Another instrumentality controlled by the program apparatus is the electro-mechanical clutches 123 to 128 inclusive of the weight loading mechanism 95. As shown in Figure 9 of the drawings, the respective clutch operating coils are connected to a corresponding number of contacts 189 supported in proper spaced relationship on the periphery of a switch disc 190. These contacts are successively engaged by a wiper contact 191 secured directly to the shaft 161 for rotation by the latter. The clutch coils are electrically connected to a direct current source of power which is grounded and supplies energizing power to the selected clutch coil.

As also indicated above the double throw triple pole switch 101, 102 and the switch 112 are also automatically operated by the shaft 161 of the program apparatus by switch gearing similar to the gearing described above. In practice the specific switching mechanisms for operating the switches 101, 102 and 112 may be the same in principle as the mechanism defined in connection with the three deck switch and program switch noted above, and accordingly, the present disclosure is not complicated with a detailed showing of this additional mechanism.

In operation of the program apparatus, after the switch 167 is moved to its initiate position, the shaft 161 and associated switching mechanisms are moved step by step through the successive angular positions required to energize, one by one, the circuits for operating the balance. At the termination of one complete cycle of operation, a limit switch (not shown) in the time delay circuit is operated to discontinue the operation of the program apparatus.

In order to reset the equipment, the switch 167 is moved to engage the position 169 in which position the winding 163 is opened and the winding 165 is energized. The motor, and hence the associated switching mechanisms are rotated in a counterclockwise direction until the cam 193 opens the switch 194 at which time all of the wipers or switch mechanisms are in their "home" positions ready for the next cycle of operation.

*Operation of balance*

The first step in the operation is to close the power switch 195 in the power supply 55 and allow thirty seconds for the electron tubes in the several circuits to reach operating condition. The switch 167 is then operated to the reset position to thereby move all of the instrumentalities to their respective "home" positions, wherein all electric circuits and mechanical equipment are aligned to the one kilogram range of weighing. The object to be weighed is then placed on the left hand end of the balance beam 21, and the switch 167 is operated to the initiate position. Thus the beam 21 is displaced by the unknown load in a counterclockwise direction. This displacement would normally go to the mechanical limit of the balance, or in other words, to a position determined by suitable stops. In accordance with this invention, however, the servomotor 86 included in the primary servo system prevents the ungoverned movement of the balance beam 21 by always applying to the beam a torque which is slightly less and opposite to the torque applied to the beam by the load. As a result, displacement of the beam is limited to a few tenths of a geometric degree, and this is accomplished as stated above without actual physical contact with the balance beam.

The unknown load of the object placed on the balance pan at the left hand side of the balance beam 21 displaces the latter in a counterclockwise direction and increases the capacitance of the condenser 26 at the right-hand end of the beam. The capacitance of the condenser at the left-hand end of the beam is accordingly proportionally decreased. This disturbance in the capacitance bridge shown in Figure 2 of the drawings is translated into a direct current voltage of the order of a fraction of a volt at the output side of the detector 25. This signal or direct current voltage is first introduced to the "anti-hunt" circuit 38 where its dynamic character is modified by the leading phase-shift circuit embodied at this point. In other words, the circuit 38 provides anticipatory properties to the primary servo system and tends to inhibit "hunting."

From the "anti-hunt" circuit 38, the modified direct current voltage signal is fed to the input side of the servo amplifier 48, where it is magnified in amplitude and power handling capacity before being admitted to the output terminals of the amplifier. From the output side of the servo amplifier 48, the magnified signal is introduced to the range selector 62. Since, as stated above the automatic balance system was initially reset to the so-called 1 kilogram range, the three-deck switch of the range selector is in the position thereof shown in Figure 2 of the drawings, wherein the magnified direct-current signal passes through the variable resistor 69 to the input side of the sensitivity error compensator circuit indicated by the block 91. As described above, resistors 92 and 93 are shunted across the output of the range selector circuit, so that the proportion of the total direct current power available at the output terminals of the compensator is a function of the adjustable resistor 93. It will be remembered that the resistor 93 is controlled by the integrated rotation of the number wheel indicator 138, and as a consequence, the direct current signal at the output side of the sensitivity error compensator is a linear function of the unknown load. It will also be noted from Figure 2 of the drawings that the output side of the sensitivity error compensator indicated by the block 91 is connected to the solenoids 87 and 88 of the servomotor 86. The servomotor applies a torque in a clockwise direction to the balance beam 21 which is slightly less than the counterclockwise torque applied to the balance beam 21 by the unknown load. As also described above, a meter 84 is connected in circuit with the range selector by the switch deck 65. The meter 84 is calibrated in weight units and may be relied upon to indicate the counterbalance weight applied to the beam 21.

For the purpose of explanation, let it be assumed that an unknown load of 141.2518 grams is applied to the left hand end of the balance beam 21. With the balance calibrated in accordance with the foregoing description, a load condition of the type noted produces over 141 volts at the output side of the servo amplifier 46. It will be remembered that shortly after the switch 167 of the program apparatus 160 is moved to its initiate position, the shaft 161 indexes so that the poles of the switch 101, 102 in the servo counter 94 respectively engage the contacts X1 and X2. When such a condition exists, the capacitor 106 is charged to 141-plus volts through the resistor R34. As the program apparatus continues to index, the switch 101, 102 moves to a position wherein the contacts Y1 and Y2 are respectively connected to opposite sides of the capacitor 106. The introduction of this 141-plus volts with polarity such that Y2 is negative and Y1 is positive, causes the servo countershaft 97 to rotate the wiper 98 through 14 angular positions to the contact P14.

Referring now to Figure 6 of the drawings, it will be noted that rotation of the servo countershaft 97 imparts a corresponding rotation to the shaft 115, and through the latter shaft effects rotation of the six gear wheels 116 respectively secured to shafts 117 to 122. At this time, it is pointed out that the program apparatus positions the wiper 191 in such a location that only the clutch 123 is operated. In other words the only shaft that is actually rotated by the servo counter-shaft 97 is the shaft 117, which corresponds to the kilogram range.

In the kilogram range, it is necessary for the system to determine whether the unknown load requires applying the kilogram weight unit (100 grams) on the right hand end of the balance beam. The cam 129 on the shaft 117 is contoured so that for all unknown loads over 100 grams, the pusher bar 130 is operated to deposit a 100 gram weight on the right hand end of the balance beam. Concurrent with this weight loading operation, the left hand number wheel 140 indexes from zero to the number 1 in order to display that the 100 gram weight has been loaded.

Upon completion of the above operation, the program apparatus shown in Figure 9 of the drawings operates to effect another set of circuit conditions as follows:

(1) The electromechanical clutch 123 on the kilogram shaft 117 is released from the latter;

(2) The charge on the capacitor 106 in the servo counter circuit is discharged into the resistor R35;

(3) The servo counter-wiper 98 and associated shaft assembly are returned to "home" or initial position; and (4) The range selector three-deck switch is indexed to the 100 gram position.

Owing to the fact that a 100 gram weight is loaded upon the right hand end of the balance beam, the remaining counterclockwise torque on the beam is now 41-plus grams and, as a result, 41-plus volts appear at the output side of the servo amplifier during the next succeeding operation of the program apparatus. During this next succeeding operation of the program apparatus, it will be necessary for the servo counter-wiper 98 to rotate the shaft 97 throughout four angular positions before equilibrium is established in its circuit. In other words, the wiper 98 will assume a position in engagement with the contact P4. Also during this interval of time, the clutch 124 is operated to connect the 100 gram shaft 118 to the servo counter-shaft 97 so that the five cams on the shaft 118 move throughout angular positions corresponding to the angular position of movement of the wiper contact 98.

Figure 11A:
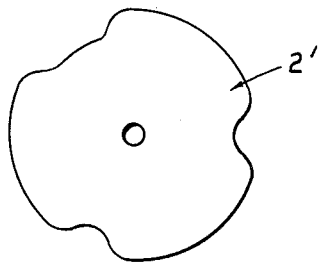
Figure 12:
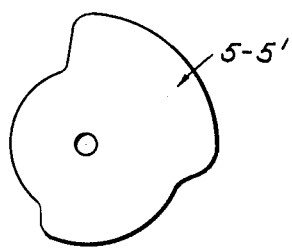

Inasmuch as the 1—2—2—5—5 system of weights is used in the present instance, it follows that two No. 2 cams of the style shown in Figures 11 and 11A are angularly positioned to load two 20 gram weights on the right hand end of the balance beam. When this condition exists, the wheel 141 of the number wheel indicator is angularly positioned to illustrate the numeral 4. Upon completion of this cycle of the operation, the 140 grams have been loaded on the right hand end of the balance beam so that the effective counterclockwise torque is at 1-plus grams.

In the next cycle of operation, the ten gram range is initiated. In this range the servo counter 94 has the option of two different modes of operation, and still arriving at the correct weight of the unknown object. For example the servo counter may operate in a manner similar to the above to effect the application of a one gram weight on the balance beam and to advance the wheel 142 of the indicator to display the numeral 1. Alternatively since any range requires 1 and ¼ units of weight, plus or minus 0.2 unit before the servo countershaft indexes one position for 1-plus grams, the servo counter need not index at all, provided the plus represents less than 0.45 gram. In this case no weight will be loaded, nor will the numeral wheel 142 be indexed, and the various instrumentalities of the automatic balance will pass through the various cycles of operation until the one gram range is reached.

Regardless of the above, the fact still remains that a net counterclockwise torque of 1-plus grams or approximately 1251 milligrams is applied to the balance beam. The actual voltage output of the servo amplifier for such a load on the one gram range is 125 volts. This represents 12 distinct units of 100 milligram weights. Thus the servo counter must index twelve angular positions, or in other words, the servo counter wiper contact 98 engages the fixed contact P12. For reasons noted above, the cams on the one gram shaft 120 operate to apply two No. 5 units (500 milligrams each) and one No. 2 unit (200 milligrams) to the right-hand end of the balance beam. In rotating through ten positions on its way to the P12 contact, the servo counter has rotated concurrently the number wheel 143 through one complete and 0.2 of another revolution. Owing to the fact that the number wheel indicator is patterned after the conventional Veeder-Root counters, each complete revolution of any wheel except the first wheel 140 indexes the preceding number wheel one position, so that the total is additive. Thus twelve positions on the fourth number wheel 143 will index the third wheel to number 1, and the fourth wheel to number 2. Thus the first four wheels of the indicator shown in Figure 8 of the drawings display 141.200 grams.

The net torque producing load remaining for the 100 milligram range is 141.2518 less 141.200, or 51.8 milligrams. Thus the output of the servo amplifier is 51.8 volts, and the 100 milligram shaft 121 is operated to position the cams therein in a manner to apply a single 50 milligram weight on the beam. Also the number wheel indicator is operated to position the fifth wheel 144 to display the number 5. The net torque producing load is now 1.8 milligrams and the output of the servo amplifier is accordingly 18 volts. The servo counter indexes "one" position as a result of the above, and the associated weight loading means applies one milligram upon the right hand end of the balance beam. Also the sixth wheel 145 of the indicator shown in Figure 8 of the drawings is angularly positioned to display the numeral 1.

The remaining load is 0.8 milligram, and is indicated on the meter 84 in order to avoid handling extremely small weights. It follows from the above that the number wheel indicator reads 141.251, and the meter indicates an addition of 0.8 milligram. In other words the total 141.2518 grams is the weight of the unknown object on the left hand end of the balance beam. Upon completion of this final cycle of operation, the switch 167 is moved to the reset position wherein the program apparatus returns all of the various circuits to their normal or inoperative state. If desired the answer may be checked by again operating the switch 167 to the initiate position.

Attention is also called to the fact at this point that any suitable means may be provided for returning the shafts 117 to 122 inclusive to their initial or "home" positions in response to movement of the switch 167 to its reset position. One means that may be employed for accomplishing this result is shown diagrammatically in Figure 6 of the drawings in association with the shaft 117, although it is to be understood that this means is duplicated in connection with each of the remaining shafts 118 to 122 inclusive. In detail a clock type spring 200 has the inner end suitably fixed to the shaft 117 and has the outer end suitably anchored on a fixed part. This spring is wound in response to rotation of the shaft 117 to load a weight unit on the balance beam, and is held in its wound condition by a ratchet mechanism 201. This mechanism comprises a ratchet wheel 202 fixed to the shaft 117 and a pawl 203 spring biased in engagement with the teeth on the wheel 202. A solenoid 204 is suitably supported adjacent the pawl 203 and is electrically connected in a circuit with the reset position of the switch 167.

The above arrangement is such that when the switch 167 is moved to its reset position, the solenoid 204 is energized and the pawl 203 is disengaged from the ratchet wheel 202 permitting the spring 200 to rotate the shaft 117 to its initial or "home" position determined by a stop 205 located in the path of travel of a projection 206 on the shaft 117 or wheel 202.

The embodiment of the invention shown in Figure 15 of the drawings illustrates a simplified form of balance construction wherein the servomotor and associated instrumentalities are eliminated. In this embodiment the deflection of the balance beam is translated into a minute direct current voltage signal proportional to the extent of deflection of the beam by a displacement detector identical to the one previously described. This voltage signal is increased in magnitude by an amplifier similar to the one described above, and the output of the amplifier is connected to an electric meter which is calibrated in weight units. The output of the amplifier is a linear function of the unknown load on the balance beam, and as a consequence, this load is recorded by the indicator. The specific circuit arrangements of the displacement detector, amplifier and indicator are similar to the corresponding circuits described in detail above. Accordingly, corresponding parts are indicated by the same reference numerals.

What I claim as my invention is:

1. A weighing device comprising a beam supported intermediately the ends for rocking movement and having an inherent stray capacitance forming the sole electrical connection between the beam and ground, a capacitance bridge including the beam and having movable plates respectively carried by opposite ends of the beam, stator plates respectively supported opposite the movable plates, means for introducing alternating power to the bridge, an output circuit having conductors respectively electrically connected to the stator plates, a source of direct current for polarizing the bridge, resistors respectively connecting the direct current source to the stator plates at opposite ends of the beam, and rectifiers also respectively electrically connecting the direct current source to the stator plates of the bridge.

2. A weighing device comprising a beam supported intermediate the ends for rocking movement and having an inherent stray capacitance forming the sole electrical connection between the beam and ground, a capacitance bridge including the beam and having movable plates respectively carried by opposite ends of the beam, stator plates respectively supported opposite the movable plates, a pair of output terminals respectively electrically connected to the stator plates through the medium of coils, an electric energy supply circuit having a coil inductively connected to the coils aforesaid, a source of direct current for polarizing the bridge, resistors respectively electrically connecting the direct current source to the first named coils, and rectifiers also respectively electrically connecting the direct current source to the first named coils.

3. A weighing device comprising a beam supported intermediate the ends for rocking movement, means for translating deflection of the beam into an electric current signal having a magnitude proportional to the extent of beam displacement from gravitational equilibrium, means for magnifying the signal including a direct current amplifier, means coupled to the output of the amplifier and opposing deflection of the beam by the load on the beam, means electrically connected between the output of the amplifier and the input of the opposing means for modifying the amplified signal to supply a voltage to the opposing means which is directly proportional to the unknown load on the beam, said voltage modifying means comprising a plurality of resistors connected in series and series parallel across the input of the opposing means, and means for adjusting either the series or parallel resistors so that the unknown load is a linear and known function.

4. A weighing device comprising a beam supported intermediate the ends for rocking movement, means for translating deflection of the beam into an electric current signal having a magnitude proportional to the extent of beam displacement from gravitational equilibrium, means for magnifying the signal including a direct current amplifier, means coupled to the output of the amplifier and opposing deflection of the beam by the load on the beam, means electrically connected between the output of the amplifier and the input of the opposing means for modifying the amplifying signal to supply a voltage to the opposing means which is directly proportional to the unknown load on the beam, said voltage modifying means comprising a plurality of variable resistors connected in series and series parallel across the input of the opposing means, means for adjusting either the series or parallel resistors so that the unknown load is a linear and known function, and a meter calibrated in weight units electrically connected in the amplifier output circuit.

5. A weighing device comprising a beam supported intermediate the ends for rocking movement, means for translating deflection of the beam into an electric current signal having a magnitude proportional to the extent of beam displacement from gravitational equilibrium, means for magnifying the signal including a direct current amplfier, means coupled to the output of the amplifier and opposing deflection of the beam by the load on the beam, means electrically connected between the output of the amplifier and the input of the opposing means for modifying the amplified signal to supply a voltage to the opposing means which is directly proportional to the unknown load on the beam, said voltage modifying means comprising a plurality of variable resistors connected in series and series parallel across the input of the opposing means, means for adjusting either the series or parallel resistors so that the unknown load is a linear and known function, a meter calibrated in weight units electrically connected in the amplifier output circuit, and a multiplier resistor electrically connected in series between the meter and the amplifier output circuit.

6. A weighing device comprising a beam supported intermediate the ends for rocking movement, means for translating deflection of the beam in either direction about its support into an electric signal having a magnitude proportional to the extent of displacement of the beam from gravitational equilibrium and having a polarity which changes as the direction of movement of the beam changes, means for magnifying the signal including a direct current amplifier, means interposed between the signal producing means and input of the amplifier to provide a leading phase shift circuit for the signal, means coupled to the output of the amplifier and opposing deflection of the beam in either direction by loads imposed on the beam, means electrically connected between the output of the amplifier and the input of the opposing means for modifying the amplified signal to apply a voltage to the opposing means which is directly proportional to the unknown load on the beam, and a meter calibrated in weight units electrically connected in the output circuit of the amplifier.

7. A weighing device comprising a beam supported intermediate the ends for rocking movement, means for translating deflection of the beam into an electric current signal having a magnitude proportional to the extent of beam displacement from gravitational equilibrium, an amplifier having the input side electrically connected to the translating means for magnifying the signal, means coupled to the output side of the amplifier for modifying the amplified signal to provide a voltage at the output side of the amplifier which is directly proportional to the unknown load on the beam, means for applying a weight on the end of the beam opposite the end on which the load is supported, and means connected to the output side of the amplifier for operating the weight applying means to load a weight on said beam.

8. A weighing device comprising a beam supported intermediate the ends for rocking movement, means for translating deflection of the beam into an electric current signal having a magnitude proportional to the extent of beam displacement from gravitational equilibrium, an amplifier having the input side electrically connected to the translating means for magnifying the signal, means coupled to the output side of the amplifier for modifying the amplified signal to provide a voltage at the output side of the amplifier which is directly proportional to the unknown load on the beam, weight loading mechanism embodying a plurality of different weights adapted to be positioned on the end of the beam opposite the end on which the load is supported, and means connected to the output of the amplifier and operable in response to different voltages delivered by the amplifier to apply different weights to the beam.

9. A weighing device comprising a beam supported intermediate the ends for rocking movement, means for translating deflection of the beam into an electric current signal having a magnitude proportional to the extent of beam displacement from gravitational equilibrium, an amplifier having the input side electrically connected to the translating means for magnifying the signal, a plurality of resistors connected in series and series parallel across the input of the opposing means, means for adjusting either the series or parallel resistors so that the unknown load is a linear and known function, switch means for consecutively connecting the resistors to the output of the amplifier, a member movable step by step along a predetermined path of travel, a circuit connected to the output of the amplifier and having means for moving said member throughout a distance determined by the voltage at the output side of the amplifier, and weight applying mechanism operated by the member and responsive to movement of the member throughout different distances to apply different weights to the end of the beam opposite the end supporting the load.

10. A weighing device comprising a beam supported intermediate the ends for rocking movement, means for translating deflection of the beam into an electric current signal having a magnitude proportional to the extent of beam displacement from gravitational equilibrium, means for magnifying the signal including a direct current amplifier, means coupled to the output of the amplifier and opposing deflection of the beam by the load on the beam, means electrically connected between the output of the amplifier and the input of the opposing means for modifying the amplified signal to supply a voltage to the opposing means which is directly proportional to the unknown load on the beam, a member movable step by step along a predetermined path of travel, a circuit energized by the output voltage of the amplifier and embodying means for moving said member throughout a distance determined by the voltage at the output side of the amplifier, and weight applying mechanism operated by the member and responsive to movement of the member throughout different distances to apply different weights to the end of the beam opposite the end carrying the load.

11. A weighing device comprising a beam supported intermediate the ends for rocking movement, means for translating deflection of the beam into an electric current signal having a magnitude proportional to the extent of beam displacement from gravitational equilibrium, an amplifier having the input side electrically connected to the translating means for magnifying the signal, means coupled to the output side of the amplifier for modifying the amplified signal to provide a voltage at the output side of the amplifier which is directly proportional to the unknown load on the beam, a member movable step by step along a predetermined path of travel, a circuit energized by the output voltage of the amplifier and embodying means for moving the member throughout a distance determined by the voltage at the output side of the amplifier, weight applying mechanism operated by the member and responsive to movement of the member throughout different distances to apply different weights to the end of the beam opposite the end carrying the load, and means operated by the weight applying mechanism for indicating the values of the weights applied.

12. A weighing device comprising a beam supported intermediate the ends for rocking movement, means for translating deflection of the beam into an electric current signal having a magnitude proportional to the extent of beam displacement from gravitational equilibrium, an amplifier having the input side electrically connected to the translating means for magnifying the signal, means coupled to the output side of the amplifier for modifying the amplified signal to provide a voltage at the output side of the amplifier which is directly proportional to the unknown load on the beam, a member movable step by step along a predetermined path of travel, a circuit energized by the output voltage of the amplifier and embodying means for moving the member throughout a distance determined by the voltage at the output side of the amplifier, weight applying mechanism operated by the member and responsive to movement of the member throughout different distances to apply different weights to the end of the beam opposite the end carrying the load, and a meter calibrated in weight units electrically connected to the output side of the amplifier.

13. A weighing device comprising a beam supported intermediate the ends for rocking movement, an electronic detector having output terminals and having means responsive to displacement of the beam in either direction about its support from gravitational equilibrium to generate a direct-current voltage signal between the terminals which is proportionate to the extent of displacement of the beam and which changes in polarity as the direction of movement of the beam changes, an amplifier for magnifying the direct-current voltage signal produced by the detector, means coupled to the output of the amplifier and opposing deflection of the beam in either direction about its support by loads imposed on the beam, said last named means including a pair of solenoids having core members respectively connected to opposite ends of the beam, coils surrounding the core members and electrically connected to the output of the amplifier, auxiliary coils encircling the core members, a power supply connected to the auxiliary coils, and an adjustable rheostat electrically connected between the auxiliary coils and power supply.

14. A weighing device comprising a beam supported intermediate the ends for rocking movement, means for translating deflection of the beam into an electric current signal having a magnitude proportional to the extent of beam displacement from gravitational equilibrium, means operated by the signal to successively apply different weights to the end of the beam opposite the end on which the load is carried, a pair of core members respectively connected to opposite ends of the beam, coils encircling the cores electrically connected at one end, a source of electric power connected to the opposite ends of the coils, a plurality of adjustable rheostats, and means operated by the weight applying means for successively connecting the rheostats in series with the coils.

15. A weighing device comprising a beam supported intermediate the ends for rocking movement, means for translating deflection of the beam into an electric current signal having a magnitude proportional to the extent of beam displacement from gravitational equilibrium, means for magnifying the signal including a direct current amplifier, means coupled to the output of the amplifier for selectively applying different weights on the end of the beam opposite the end carrying the load, and means for correcting variations in deflection of the beam resulting from inaccuracies in the various weights.

16. A weighing device comprising a beam fulcrumed intermediate the ends for rocking movement, a source of alternating current energy, means for translating deflection of the beam into an electric current signal having a magnitude proportional to the extent of beam displacement from gravitational equilibrium, said translating means including a detector circuit cooperating with the beam to provide a capacitance bridge having two legs respectively electrically connected to the source of alternating current energy and having the junction between the two legs connected to ground, said beam forming a junction of the other two legs of the capacitance bridge and having the return path to ground formed by virtue of the inherent stray capacitance of the beam.

17. A weighing device comprising a load supporting member movable in opposite directions from a normal position, a detector circuit energized by alternating electric power and having means responsive to displacement of the member in either direction from its neutral position to produce an alternating current signal having a magnitude proportional to the extent of movement of the member, means in the detector circuit for changing the alternating current signal to a direct signal of one polarity as the member moves in one direction and of the opposite polarity as the member moves in another direction, an amplifier for magnifying the direct current signal, and resistive-capacitative means constituting a phase advancing circuit and connected between the output of the detector circuit and the amplifier for modifying the direct current signal.

18. A weighing device comprising a beam supported intermediate its ends for rocking movement, a detector circuit energized by alternating electric power and having output terminals, means in the detector circuit responsive to displacement of the beam in either direction about its support from gravitational equilibrium to generate an alternating current signal proportional to the extent of displacement of the beam, means also in the detector circuit for changing the alternating current signal to a direct current signal between the output terminals of one polarity when the beam moves in one direction and of the opposite polarity when the beam moves in the other direction, an amplifier for magnifying the direct current voltage signal, and a phase advancing circuit comprising a resistive-capacitance network between the detector and the amplifier.

19. A weighing device comprising a load supporting member movable in one direction in response to a load on the member, means for translating movement of the member into an electric current signal having a magnitude proportional to the extent of movement of said member, means for magnifying the signal including a direct current amplifier, means coupled to the output of the amplifier for selectively applying different weights on the member, and an electric circuit energized in response to the weights applied to the member and embodying means for correcting movement of the member resulting from inaccuracies in the various weights.

20. A weight device comprising a load supporting member movable in opposite directions from a neutral position, means responsive to movement of the member in either direction to produce an electric signal which has a magnitude proportional to the extent of movement of the member and which changes in polarity as the direction of movement of the member changes, and means to compensate for decreasing deflection sensitivity of the member as the load on the member is increased.

21. A weighing device having in combination a beam supported intermediate its ends for rocking movement and having provision at one end for supporting an unknown load, means for estimating an unknown load in a plurality of different weighing ranges which progressively decrease in value from a predetermined maximum value, and means for successively applying the estimated weight units to the other end portion of the beam.

22. A weighing device having in combination a beam supported intermediate its ends for rocking movement and having provision at one end for supporting an unknown load, means for underestimating the unknown load to be applied to said one end portion of the beam in a plurality of different decade weighing ranges which progressively decrease in value from a kilogram range to a milligram range, and means for successively applying the estimated weight units to the other end of the beam.

23. A weighing device having in combination a beam supported intermediate its ends for rocking movement, means for applying an unknown load on one end portion of the beam, means for translating deflection of the beam by the unknown load into an electric signal which varies in magnitude as the extent of beam deflection varies, means for estimating the unknown load in a plurality of different weighing ranges which progressively decrease in value from a predetermined maximum value, and means for successively applying the estimated weight units in said ranges to the other end portion of the beam in response to said electric signal.

24. A weighing device having in combination a beam supported intermediate its ends for rocking movement, means for applying an unknown load on one end portion of the beam, means for translating deflection of the beam by the unknown load into an electric signal which varies in magnitude as the extent of beam deflection varies, an amplifier for magnifying the electric signal, means for successively applying different known weight units to the other end portion of the beam in response to the output voltage of the amplifier, and means for maintaining the full load output voltage of the amplifier substantially the same for each successive weighing operation.

25. A weighing device having in combination a beam supported intermediate its ends for rocking movement, means for applying the unknown load to one end portion of the beam, means for translating deflection of the beam by the load into an electric signal which varies in magnitude as the extent of movement of the beam varies, an amplifier for magnifying the electrical signal, means connected to the output of the amplifier for estimating the unknown load in a plurality of different weighing ranges which progressively decrease in value from a predetermined maximum value, means for successively applying the estimated weight units in said ranges to the other end of the balance beam in response to the magnified electrical signal, and means for maintaining the full load output voltage of the amplifier substantially the same for each successive weighing range.

26. A weighing device having in combination a beam supported intermediate its ends for rocking movement, means for applying the unknown load on one end portion of the beam, means for translating movement of the beam by said load into an electric signal which varies in magnitude as the extent of deflection of the beam varies, an amplifier for magnifying the electrical signal, means connected to the output of the amplifier for electronically estimating the unknown load in a plurality of different weighing ranges which progressively decrease in value from a predetermined maximum value, means for successively applying the estimated weight units in said ranges to the other end of the balance beam in response to the magnified electrical signal, and means for damping movement of the balance beam subsequent to successive weighing operations.

27. A weighing device comprising a member supported for movement in opposite directions from a position of equilibrium and movable in one direction from said position in response to the application of a load on the member, means for translating movement of the member into an electric current signal having a magnitude proportional to the extent of movement of the member from said position of equilibrium, an amplifier for magnifying the signal, a circuit electrically connected to the output of the amplifier and having means for opposing movement of the member by a load on said member, means electrically connected between the output of the amplifier and the input of the opposing circuit for modifying the amplified signal to supply a voltage to the opposing circuit which is directly proportional to the unknown load on the member, said voltage modifying means comprising a plurality of resistors respectively corresponding to different weighing ranges, and switching means for respectively connecting the resistors in a predetermined order to the input of the opposing circuit.

28. The structure defined in claim 27 wherein said switching means successively serially electrically connects the resistors to the input of the opposing circuit and wherein said resistors progressively increase in value from the first resistor connected to the opposing circuit to the last resistor connected to said opposing circuit.

29. The structure defined in claim 28 comprising shunting capacitors respectively connected in parallel with certain of the resistors to critically damp response of the member.

30. The structure defined in claim 28 comprising additional resistors respectively electrically connected in series with certain of the resistors aforesaid and successively electrically connected in parallel to the input of the opposing circuit by said switch means.

31. The structure defined in claim 30 comprising capacitors respectively electrically connected in parallel with certain of the first named resistors to critically damp response of said member.

32. A weighing device comprising a beam supported intermediate the ends thereof for rocking movement and having an inherent stray capacitance forming the sole electrical connection between the beam and ground, a capacitance bridge including said beam and having movable plates respectively carried by opposite ends of the beam, stator plates respectively supported in opposed relationship to the movable plates, a coil connected at opposite ends to the source of electrical energy, coils symmetrically arranged with respect to the first coil and inductively coupled to the first named coil, one end of each of the symmetrically positioned coils being connected to the respective stator plates, and rectifying means connected to the opposite ends of the symmetrically positioned coils.

33. A weighing device comprising a beam supported intermediate the ends for rocking movement and having an inherent stray capacitance forming the sole electrical connection between the beam and ground, a capacitance bridge including the beam and having movable plates respectively supported in opposed relationship to the movable plates, a pair of coils having corresponding ends respectively electrically connected to the stator plates and having the opposite ends connected to output terminals, a third coil inductively coupled to the pair of coils, and an electric energy supply circuit connected to the third coil.

34. A weighing device comprising a member supported for movement in opposite directions from a position of equilibrium and having an inherent stray capacitance forming the sole electrical connection between the member and ground, a capacitance bridge including said member and having a movable plate mounted on the member for movement thereby, a stator plate supported in opposed relationship to the movable plate, a first coil having one end connected to the stator plate and having the other end connected to an output terminal, a second coil inductively coupled to said first coil, and an electric energy supply circuit connected to the second coil.

References Cited in the file of this patent

UNITED STATES PATENTS

| Number | Name | Date |
|---|---|---|
| 1,431,638 | Dowling | Oct. 10, 1922 |
| 1,661,556 | Bryce | Mar. 6, 1928 |
| 1,685,789 | Thomas | Oct. 2, 1928 |
| 1,773,570 | Bryce | Aug. 19, 1930 |
| 2,108,575 | Benedict | Feb. 15, 1938 |
| 2,117,894 | Lenehan | May 17, 1938 |
| 2,141,175 | Dawson | Dec. 24, 1938 |
| 2,192,905 | Gattoni | Mar. 12, 1940 |
| 2,346,121 | Weckerly | Apr. 4, 1944 |
| 2,360,751 | Ziebolz | Oct. 17, 1944 |
| 2,371,040 | Fisher et al. | Mar. 6, 1945 |
| 2,373,676 | Germeshausen | Apr. 17, 1945 |
| 2,387,242 | Carliss | Oct. 23, 1945 |
| 2,415,403 | Bachman | Feb. 11, 1947 |
| 2,429,137 | Root | Oct. 14, 1947 |
| 2,488,349 | Thurston | Nov. 15, 1949 |
| 2,597,831 | Willis | Mar. 20, 1952 |
| 2,597,899 | Payne | May 27, 1952 |

FOREIGN PATENTS

| Number | Country | Date |
|---|---|---|
| 816,908 | France | May 10, 1937 |